(12) United States Patent
Fukawatase et al.

(10) Patent No.: US 7,896,386 B2
(45) Date of Patent: Mar. 1, 2011

(54) VEHICLE KNEE AIRBAG DEVICE AND METHOD OF DEPLOYING VEHICLE KNEE AIRBAG

(75) Inventors: Osamu Fukawatase, Aichi (JP); Makoto Sekizuka, Toyota (JP); Kenji Imamura, Toyota (JP); Takuya Nezaki, Mizunami (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 175 days.

(21) Appl. No.: 12/299,959

(22) PCT Filed: May 7, 2007

(86) PCT No.: PCT/JP2007/059468

§ 371 (c)(1),
(2), (4) Date: Nov. 7, 2008

(87) PCT Pub. No.: WO2007/129690

PCT Pub. Date: Nov. 15, 2007

(65) Prior Publication Data

US 2009/0115172 A1    May 7, 2009

(30) Foreign Application Priority Data

May 9, 2006 (JP) .............................. 2006-130674

(51) Int. Cl.
*B60R 21/16* (2006.01)
(52) U.S. Cl. .................................... 280/730.1; 280/732
(58) Field of Classification Search .............. 280/730.1, 280/732
See application file for complete search history.

(56) References Cited

U.S. PATENT DOCUMENTS 5,189,255 A    2/1993    Fukabori et al.

(Continued)

FOREIGN PATENT DOCUMENTS

DE    201 17 794    5/2002

(Continued)

OTHER PUBLICATIONS

Extended European Search Report for EP Appl. No. 07742903.3 dated Mar. 26, 2010.

*Primary Examiner*—Paul N Dickson
*Assistant Examiner*—Drew Brown
(74) *Attorney, Agent, or Firm*—Finnegan, Henderson, Farabow, Garrett & Dunner, LLP

(57) ABSTRACT

In a knee airbag attached to a steering column, the knee airbag is inflated and deployed quickly to a small space between an instrument panel and the knees of a vehicle occupant in a collision.

A knee airbag 36 of a knee airbag device 10 is formed of a first inflation portion 38 which extends in a vehicle lateral direction along an instrument panel 12 side, and a second inflation portion 46, which is deployed to a vehicle occupant knee side. A gas supply opening 42, to which gas ejected from an inflator 22 is supplied, is disposed at a first inflation portion 38 side. The gas supply opening 42, and the pair of protection portions 46 provided at left and right end portions of knee airbag 36, are provided on substantially the same line in a vehicle lateral direction, and the first inflation portion 36 communicates the two as a gas flow path. Therefore, in a frontal collision, even if a space 48 between the instrument panel 12 and the knees of the vehicle occupant is small, the pair of protection portions 46 can be quickly inflated and deployed to the small space 48.

16 Claims, 23 Drawing Sheets

U.S. PATENT DOCUMENTS

| | | | |
|---|---|---|---|
| 5,570,901 A | 11/1996 | Fyrainer | |
| 5,797,620 A * | 8/1998 | Eyrainer | 280/730.1 |
| 7,232,149 B2 * | 6/2007 | Hotta et al. | 280/730.1 |
| 7,549,671 B2 * | 6/2009 | Mizuno et al. | 280/730.1 |
| 7,600,776 B2 * | 10/2009 | Hoshino et al. | 280/730.1 |
| 7,604,252 B2 * | 10/2009 | Heitplatz et al. | 280/730.1 |
| 7,681,908 B2 * | 3/2010 | Fukawatase et al. | 280/728.3 |
| 2002/0171230 A1 | 11/2002 | Takimoto et al. | |
| 2003/0107206 A1 * | 6/2003 | Takimoto et al. | 280/730.1 |
| 2003/0116945 A1 | 6/2003 | Abe | |
| 2005/0062265 A1 | 3/2005 | Hotta et al. | |
| 2005/0062273 A1 | 3/2005 | Matsuda et al. | |
| 2005/0230941 A1 * | 10/2005 | Takimoto et al. | 280/730.1 |
| 2006/0076758 A1 | 4/2006 | Yokoyama | |
| 2007/0182134 A1 * | 8/2007 | Mizuno et al. | 280/730.1 |
| 2008/0122205 A1 * | 5/2008 | Imamura et al. | 280/730.1 |
| 2008/0217888 A1 * | 9/2008 | Fukawatase et al. | 280/730.1 |
| 2009/0184498 A1 * | 7/2009 | Takimoto et al. | 280/730.1 |
| 2009/0302585 A1 * | 12/2009 | Ishida | 280/730.1 |
| 2010/0013200 A1 * | 1/2010 | Fukawatase et al. | 280/730.1 |

FOREIGN PATENT DOCUMENTS

| | | |
|---|---|---|
| DE | 102 50 405 | 5/2003 |
| EP | 1 531 098 | 5/2005 |
| JP | 3-92447 | 4/1991 |
| JP | 5-42855 | 2/1993 |
| JP | 08-301054 | 11/1996 |
| JP | 9-104317 | 4/1997 |
| JP | 10-71911 | 3/1998 |
| JP | 11-278189 | 10/1999 |
| JP | 2001-106013 | 4/2001 |
| JP | 2002-37003 | 2/2002 |
| JP | 2002-337649 | 11/2002 |
| JP | 2003-182500 | 7/2003 |
| JP | 2005-53440 | 3/2005 |
| JP | 2005-96576 | 4/2005 |
| JP | 2005-96625 | 4/2005 |

* cited by examiner

VEHICLE KNEE AIRBAG DEVICE AND METHOD OF DEPLOYING VEHICLE KNEE AIRBAG

CROSS-REFERENCE TO RELATED APPLICATIONS

This application is a national phase application of International Application No. PCT/JP2007/059468, filed May 7, 2007, and claims the priority of Japanese Application No. 2006-130674, filed May 9, 2006, the contents of both of which are incorporated herein by reference.

TECHNICAL FIELD

The present invention relates to a vehicle knee airbag device that is interposed between an instrument panel and the knees of a vehicle occupant in a collision, and a method of deploying a vehicle knee airbag.

BACKGROUND ART

A knee airbag device attached to a steering column is disclosed in patent document 1 below. To explain briefly, in this conventional technique, a knee airbag is stored in a folded state inside a column cover of a steering column, and in a frontal collision, the column cover develops in a double-door manner, and the knee airbag inflates and deploys in left and right directions in a radial shape that takes the steering column as an approximate center. Patent document 1: Japanese Patent Application Laid-Open (JP-A) No. 2002-37003

DESCRIPTION OF THE INVENTION

Problem to be Solved by the Invention

However, since the space between an instrument panel and the knees of an occupant in a seated state is usually small, in a frontal collision, when the knees of an occupant are to be constrained by a knee airbag, it has been extremely difficult to inflate and deploy a knee airbag between the knees and the instrument panel before the knees strike the instrument panel. Therefore, although the above conventional technique may have some value, further improvements are desired.

The present invention considers the above facts, and an object thereof is to achieve a knee airbag device in which a knee airbag attached to a steering column can be inflated and deployed quickly to a small space between the knees of a vehicle occupant and an instrument panel in a collision, and a method of deploying a vehicle airbag.

Means for Solving the Problem

The vehicle knee airbag device of the present invention recited in claim 1 is a vehicle airbag device stored in a folded state in a column cover of a steering column, that inflates in a collision due to a supply of gas from a gas supply means, and opens a cover provided at the column cover, and deploys a knee airbag between an instrument panel and the knees of a vehicle occupant, in which: after completely inflating and deploying, the knee airbag comprises a pair of protection portions positioned at both sides of the steering column that protect the knees of the vehicle occupant, and a gas flow path that inflates along a vehicle lateral direction at an outer side of the column cover and communicates the pair of protection portions at a side of an instrument panel that opposes the knees of the vehicle occupant, and a gas supply opening, provided at the gas flow path and leading from the gas supply means, and the pair of protection portions are arranged on substantially the same straight line in a vehicle lateral direction via the gas flow path.

The invention recited in claim 2 is the vehicle knee airbag device recited in claim 1, in which a sectional area of respective end portion sides of the knee airbag in a vehicle lateral direction is larger than that of a central portion.

The invention recited in claim 3 is the vehicle knee airbag device recited in claim 2, in which respective end portion sides of the knee airbag in a vehicle lateral direction are longer in a vehicle vertical direction than a central portion.

The invention recited in claim 4 is the vehicle knee airbag device of any one of claims 1 to 3, in which the knee airbag is provided with a thickness regulating means for regulating a thickness of a bag.

The invention recited in claim 5 is the vehicle knee airbag device of any one of claims 1 to 4, in which the gas flow path is provided with a first gas flow path extending in a vehicle lateral direction.

The invention recited in claim 6 is the vehicle knee airbag device of claim 5, in which the first gas flow path is provided with a second gas flow path that communicates therewith at an end portion thereof in a lateral direction of the gas flow path, and that extends in a substantially vehicle vertical direction.

The invention recited in claim 7 is the vehicle knee airbag device of claim 5 or claim 6, in which the gas flow path is formed of an inner bag or an inner duct provided in the knee airbag.

The invention recited in claim 8 is the vehicle knee airbag device of any one of claims 5 to 7, in which the gas flow path is formed using a tear seam that breaks when an internal pressure of the gas flow path reaches a predetermined value.

The invention recited in claim 9 is the vehicle knee airbag device of claim 7 or 8, in which an inner diameter of a central portion in a length direction of the inner bag or inner duct is larger than respective inner diameters of both ends in a length direction thereof.

The invention recited in claim 10 is the vehicle knee airbag device of claim 7 or 8, in which, in the case of an instrument panel in which the distance between one knee and the instrument panel is shorter than the distance between another knee and the instrument panel, the length of the gas flow path is configured to have short and long lengths from a bent portion to respective ends of the gas flow path, the bent portion resulting from bending the gas flow path at a predetermined position in a length direction, and the knee airbag is provided such that, when it is in an inflated and deployed state, the short length of the gas flow path is deployed between the instrument panel and one knee, and the long length of the gas flow path is deployed between the instrument panel and another knee.

The invention recited in claim 11 is the vehicle knee airbag device of claim 8, in which the inner duct is provided by reverse folding a portion of the gas supply means side of the knee airbag towards the knee airbag main body, and stitching the fold using a tear seam.

The invention recited in claim 12 is the vehicle knee airbag device of any one of claims 1 to 11, in which a gas supply opening from the gas supply means is provided near a central portion in a vehicle lateral direction of the gas supply means, and gas ejected from the gas supply opening is supplied from the central portion side of the gas flow path to both of an inner side and an outer side in a vehicle lateral direction.

The invention recited in claim 13 is the vehicle knee airbag device of claim 12, in which the gas supply means is disposed so as to be partially inserted at a position facing a gas supply opening, and at an outer peripheral portion of the gas supply means, a plurality of gas ejection holes are formed, and the gas ejection holes are only disposed at both of an outer side and an inner side in a vehicle lateral direction of the gas flow path.

The invention recited in claim 14 is the vehicle knee airbag device of claim 12, in which the gas supply means is disposed along a vehicle lateral direction, and a plurality of gas ejection holes are formed at outer peripheral portions of both ends in a length direction of the gas supply means, and the gas ejection holes are tapered holes that incline at a predetermined angle with respect to an axis line of the gas supply means.

The invention recited in claim 15 is the vehicle knee airbag device of claim 7, in which the inner bag is disposed in the knee airbag, and the gas supply means is disposed in the inner bag.

The invention recited in claim 16 is a method of deploying a vehicle knee airbag, including: in a vehicle knee airbag deployment method wherein a knee airbag stored in a folded state in a column cover of a steering column is inflated and deployed to between an instrument panel and the knees of a vehicle occupant due to gas supplied by a gas supply means in a collision, guiding the gas supplied by the gas supply means along a gas flow path provided along a vehicle lateral direction at an instrument panel side and at a column cover outer side of the knee airbag, thereby firstly inflating and deploying, between the instrument panel and the knees of a vehicle occupant, a pair of protection portions provided at both ends in a vehicle lateral direction of the gas flow path, and subsequently supplying gas to remaining parts of the knee airbag and inflating and deploying the remaining parts, from the pair of protection portions, or from the gas flow path, or from both the pair of protection portions and the gas flow path.

According to the present invention recited in claim 1, in the event of a collision, gas is supplied from a gas supply means to the inside of a knee airbag stored in a folded state in a column cover of a steering column. As a result, a cover provided at the column cover opens, and the knee airbag inflates and deploys to between an instrument panel and the knees of a vehicle occupant.

Here, in the present invention, since, when the knee airbag is in a fully inflated and deployed state, a pair of protection portions that inflate and deploy at both sides of the steering column and that protect the knees of the vehicle occupant are communicated by a gas flow path at a side of an instrument panel that opposes the knees of the vehicle occupant, and a gas supply opening that leads from a gas supply means is provided to the gas flow path, when gas is supplied from the gas supply means, the gas flows from the gas supply opening through the gas flow path, and subsequently flows in a vehicle lateral direction, and inflates the pair of protection portions. Further, since the gas supply opening and the pair of protection portions are arranged on substantially the same straight line in a vehicle lateral direction via gas flow path, the gas supply opening and the pair of protection portions are linked by substantially the shortest possible distance. As a result, in a collision, the pair of protection portions of the knee airbag can be quickly interposed to a small space between the instrument panel and the knees of a vehicle occupant.

In other words, in the present invention, due to the gas flow path disposed at an instrument panel side, the pair of protection portions mutually communicate, and in a collision, the pair of protection portions can be instantly sent to a small space between the instrument panel and the knees of a vehicle occupant via the gas flow path, where they inflate and deploy, and subsequently, the remaining portions of the knee airbag can be inflated and deployed.

According to the present invention recited in claim 2, since a sectional area of respective end portion sides of the knee airbag in a vehicle lateral direction is configured to be larger than that of a central portion, necessary gas capacity can be reduced to the extent that the sectional area of the central portion is reduced. In other words, assuming a gas supply means having the same gas capacity is used, both end portions can be inflated and deployed with greater speed in proportion to the extent that the sectional area of the central portion is reduced.

According to the present invention recited in claim 3, since respective end portion sides of the knee airbag in a vehicle lateral direction are configured to be longer in a substantially vehicle vertical direction than a central portion, a vehicle occupant knee protection region expands in a vertical direction. Therefore, even when the seat height of a vehicle seat is adjusted according to the bodily frame of a vehicle occupant, the knees of the vehicle occupant can be accurately received and stopped.

According to the present invention recited in claim 4, since the knee airbag is provided with a thickness regulating means for regulating a thickness of a bag, the thickness of the knee airbag at a time of inflation and deployment (particularly the thickness of the left and right protection portions) can be set to a desired thickness. As a result, the knee airbag is deployed in a vehicle lateral direction, and both end portions thereof are more readily interposed at a small space between the instrument panel and the knees of a vehicle occupant.

According to the present invention recited in claim 5, since the gas flow path of the knee airbag is provided with a first gas flow path extending in a vehicle lateral direction, the first gas supplied from the gas supply means is not wasted, and flows through the first gas flow path to be used in the deployment of the knee airbag in a vehicle lateral direction.

According to the present invention recited in claim 6, since, in the gas flow path, the first gas flow path is provided with a second gas flow path that communicates therewith at an end portion thereof in a lateral direction of the gas flow path, and that extends in a substantially vehicle vertical direction, not only can the pair of protection portions be deployed quickly in a vehicle lateral direction using the first gas flow path, but protection portions at a side where the second gas flow path is provided can also be quickly deployed in a vehicle vertical direction.

According to the present invention recited in claim 7, since the gas flow path is formed of an inner bag or an inner duct provided in the knee airbag, a gas flow path may be reliably ensured in the knee airbag.

According to the present invention recited in claim 8, since the gas flow path is formed using a tear seam that breaks when an internal pressure of the gas flow path reaches a predetermined value, fine-tuning of the duration of time in which the gas flow path is supported can be easily performed. Further, by using a tear seam, it is possible to avoid an increase in the number of parts and an increase in the complexity of the structure of the knee airbag.

According to the present invention recited in claim 9, since the inner diameter of a central portion in a length direction of the inner bag or inner duct is larger than respective inner diameters of both ends in a length direction thereof, when the knee airbag inflates, the central portion in a length direction of the inner bag or inner duct inflates before both end portions in the length direction.

According to the present invention recited in claim 10, considering that the designs for instrument panels are becoming increasingly varied, an instrument panel may arise in which the distance between one knee and the instrument panel is shorter than the distance between another knee and the instrument panel. In this case, rather than configuring a knee airbag to inflate and deploy equally to the left and right, the gas flow path is configured to have short and long lengths, and the gas flow path which is shorter in the length direction is inflated and deployed at the side where the distance of the space is smaller in a vehicle front-rear direction, and conversely, the gas flow path which is longer in the length direction is inflated and deployed at the side where the distance of the space is larger in a vehicle front rear direction, thereby obtaining a knee airbag inflation and deployment state which is well-balanced to the left and right.

According to the present invention recited in claim 11, since the inner duct is provided by reverse folding a portion of the gas supply means side of the knee airbag towards the knee airbag main body, and stitching the fold using a tear seam, the number of components can be reduced compared to a case in which the knee airbag is configured with a separate inner duct. Further, the break strength of the tear seam can be easily changed.

According to the present invention recited in claim 12, since a gas supply opening from the gas supply means is provided near a central portion in a vehicle lateral direction of the gas flow path, and gas ejected from the gas supply opening is supplied from the central portion side of the gas flow path to both of an inner side and an outer side in a vehicle lateral direction, by using this invention together with the invention recited in any one of claims 1-11, the knee airbag can be more effectively inflated and deployed in a vehicle lateral direction.

According to the present invention recited in claim 13, since the gas supply means is disposed so as to be partially inserted at a position facing a gas supply opening, and a plurality of gas ejection holes are formed at an outer peripheral portion of the gas supply means, and the gas ejection holes are only disposed at both of an outer side and an inner side in a vehicle lateral direction of the gas flow path, the gas generated from the gas supply means is only ejected to an inner side and an outer side in a vehicle lateral direction of the gas flow path.

According to the present invention recited in claim 14, since the gas supply means is disposed along a vehicle lateral direction, and a plurality of gas ejection holes are formed at outer peripheral portions of both ends a length direction of the gas supply means, and the gas ejection holes are tapered holes that incline at a predetermined angle with respect to an axis line of the gas supply means, gas is not ejected in a radial direction from outer peripheral portions of both ends in a length direction of the gas supply means, but is ejected towards a direction intersecting an axial direction. Therefore, gas can be sent efficiently in a vehicle lateral direction of the knee airbag.

According to the present invention recited in claim 15, since the inner bag is disposed in the knee airbag, and the gas supply means is disposed in the inner bag, a gas flow path can be reliably ensured in the knee airbag.

According to the present invention recited in claim 16, in the event of a collision, gas is supplied from a gas supply means to the inside of a knee airbag stored in a folded state in a column cover of a steering column. Due to this, the knee airbag deploys to between an instrument panel and the knees of a vehicle occupant.

Here, in the present invention, firstly, gas supplied by the gas supply means is guided along a gas flow path provided along a vehicle lateral direction at an instrument panel side and at a column cover outer side of the knee airbag. Due to this, a pair of protection portions provided at both ends in a vehicle lateral direction of the gas flow path are inflated and deployed between the instrument panel and the knees of a vehicle occupant before the remaining parts. Subsequently, gas is supplied to remaining parts of the knee airbag from the pair of protection portions, or from the gas flow path, or from both the pair of protection portions and the gas flow path, thereby inflating and deploying the remaining parts.

In other words, in the present invention, in a first deployment operation of the knee airbag, a gas flow path is inflated along an instrument panel in a vehicle lateral direction, and via this gas flow path a pair of protection portions are inflated and deployed, and therefore, even when a space between the instrument panel and the knees of a vehicle occupant is small, the pair of protection portions can be quickly inflated and deployed to the small space.

EFFECTS OF THE INVENTION

As described above, the knee airbag device according to the present invention recited in claim 1 has an excellent effect whereby a knee airbag attached to a steering column may be quickly inflated and deployed to a small space between an instrument panel the and knees of a vehicle occupant in a collision.

The knee airbag device according to the present invention recited in claim 2 possesses excellent effects whereby the capacity of a gas supply means may be reduced, and a knee airbag may be deployed quickly in a vehicle lateral direction.

The knee airbag device according to the present invention recited in claim 3 possesses an excellent effect whereby a large range of difference in bodily frames of vehicle occupants may be accommodated for.

The knee airbag device according to the present invention recited in claim 4 possesses an excellent effect whereby both end portions of a knee airbag may be more reliably interposed to a small space between an instrument panel and the knees of a vehicle occupant.

The knee airbag device according to the present invention recited in claim 5 possesses an excellent effect whereby a pair of protection portions of a knee airbag may be quickly sent to, inflated and deployed at a space between an instrument panel and the knees of a vehicle occupant.

The knee airbag device according to the present invention recited in claim 6 possesses an excellent effect whereby gas is efficiently guided such that a pair of protection portions provided to a knee airbag are inflated and deployed at a desired position in a vehicle lateral direction and a desired position in a vehicle vertical direction.

The knee airbag device according to the present invention recited in claim 7 possesses an excellent effect whereby a knee airbag can be quickly and reliably inflated and deployed to a small space between an instrument panel and the knees of a vehicle occupant in a collision.

The knee airbag device according to the present invention recited in claim 8 possesses an excellent effect whereby a gas flow path may be reliably maintained for a required length of time with a simple structure.

The knee airbag device according to the present invention recited in claim 9 possesses an excellent effect whereby a protection area with respect to a steering column can be ensured (enlarged), and following this a pair of left and right protection portions can be inflated.

The knee airbag device according to the present invention recited in claim 10 possesses an excellent effect whereby, even in the case of a design in which the distance between an instrument panel and the knees of a vehicle occupant differs between left and right, a knee airbag can be appropriately interposed between the instrument panel and the knees of the vehicle occupant.

The knee airbag device according to the present invention recited in claim 11 possesses an excellent effect whereby, compared to a case in which a knee airbag is configured with a separate inner duct, costs can be reduced, and fine-tuning of break strength can be easily performed.

The knee airbag device according to the present invention recited in claim 12 possesses an excellent effect whereby a knee airbag may be more quickly inflated and deployed in a vehicle lateral direction.

The knee airbag device according to the present invention recited in claim 13 possesses an excellent effect whereby a knee airbag may be more quickly inflated and deployed in a vehicle lateral direction.

The knee airbag device according to the present invention recited in claim 14 possesses an excellent effect whereby a knee airbag may be more quickly inflated and deployed in a vehicle lateral direction.

The knee airbag device according to the present invention recited in claim 15 possesses an excellent effect whereby a knee airbag can be quickly and reliably inflated and deployed to a small space between an instrument panel and the knees of a vehicle occupant in a collision.

The knee airbag device according to the present invention recited in claim 16 has an excellent effect whereby a knee airbag attached to a steering column may be quickly inflated and deployed to a small space between an instrument panel the and knees of a vehicle occupant in a collision.

BEST MODE FOR IMPLEMENTING THE INVENTION

Below, a first embodiment of the vehicle knee airbag device according to the invention will be described using FIGS. 1-4. Further, in the figures, arrow FR indicates a front side of a vehicle, arrow UP indicates an upper side of a vehicle, and arrow IN indicates an inner side in a lateral direction of a vehicle, these being shown in the figures as appropriate.

Figure 1:
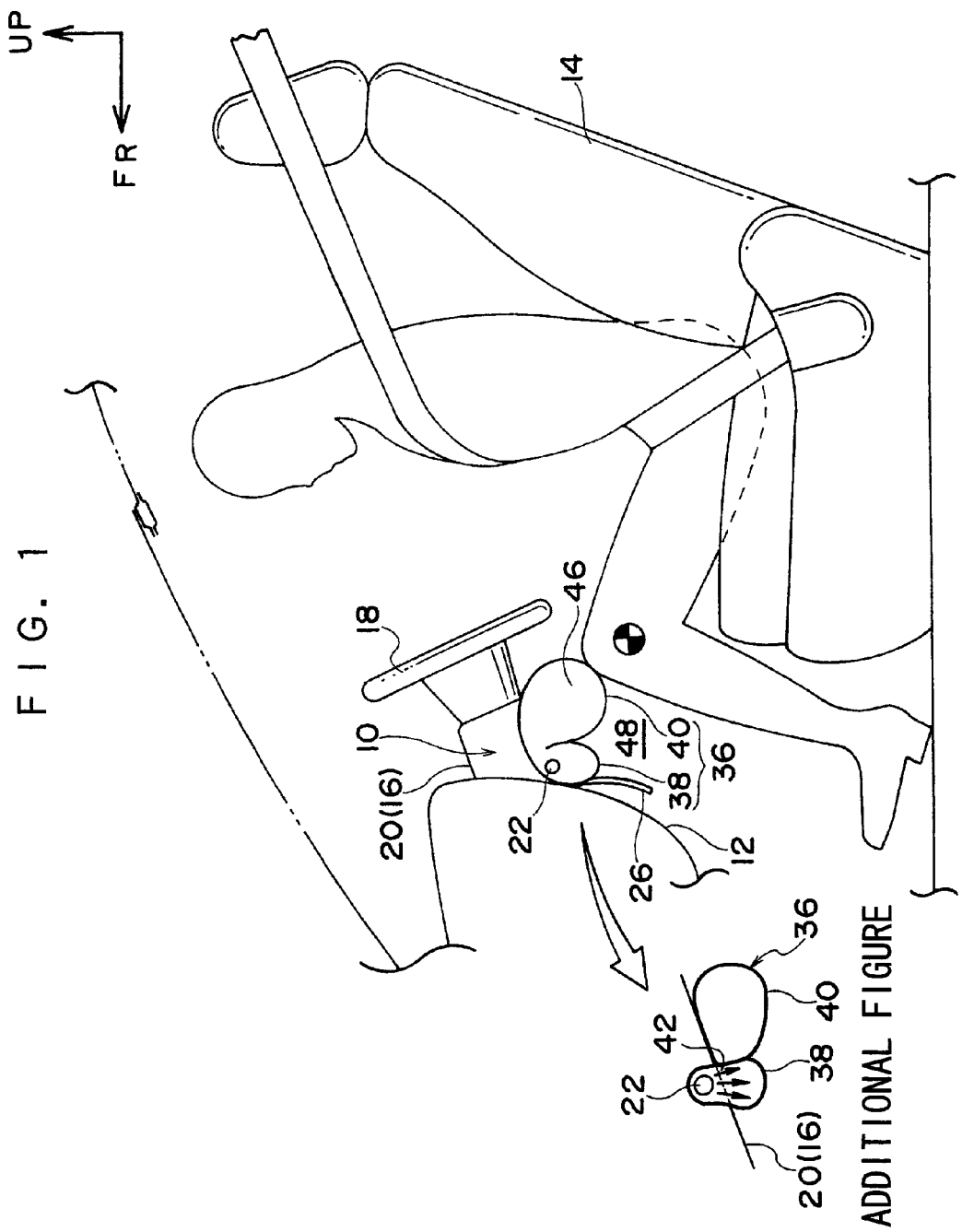
FIG. 1 is a side view showing the vehicle knee airbag device attached to a column according to a first embodiment in an actuated state.
Figure 2:
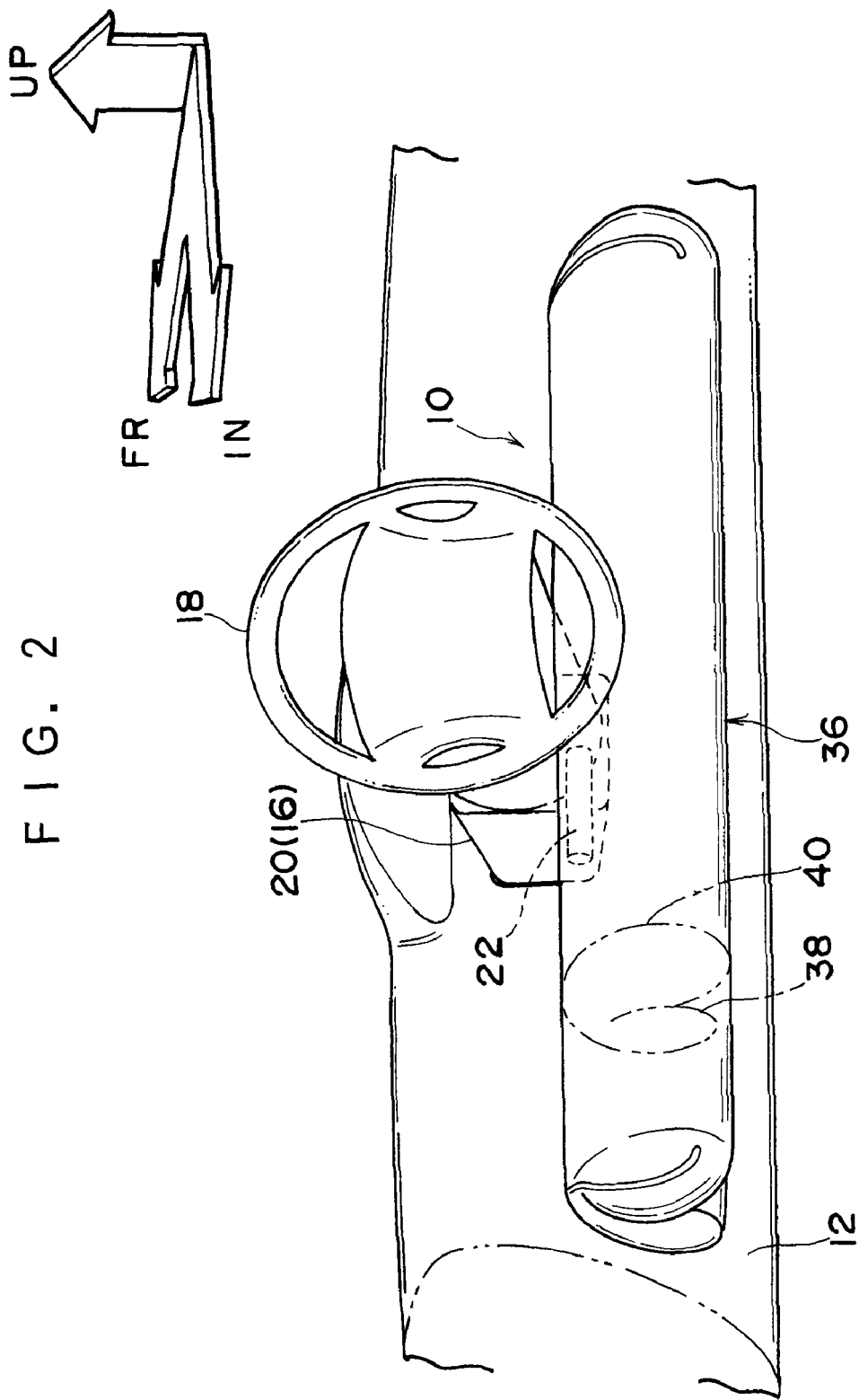
FIG. 2 is a perspective view showing the vehicle knee airbag device shown in FIG. 1 in an actuated state.
Figure 3:
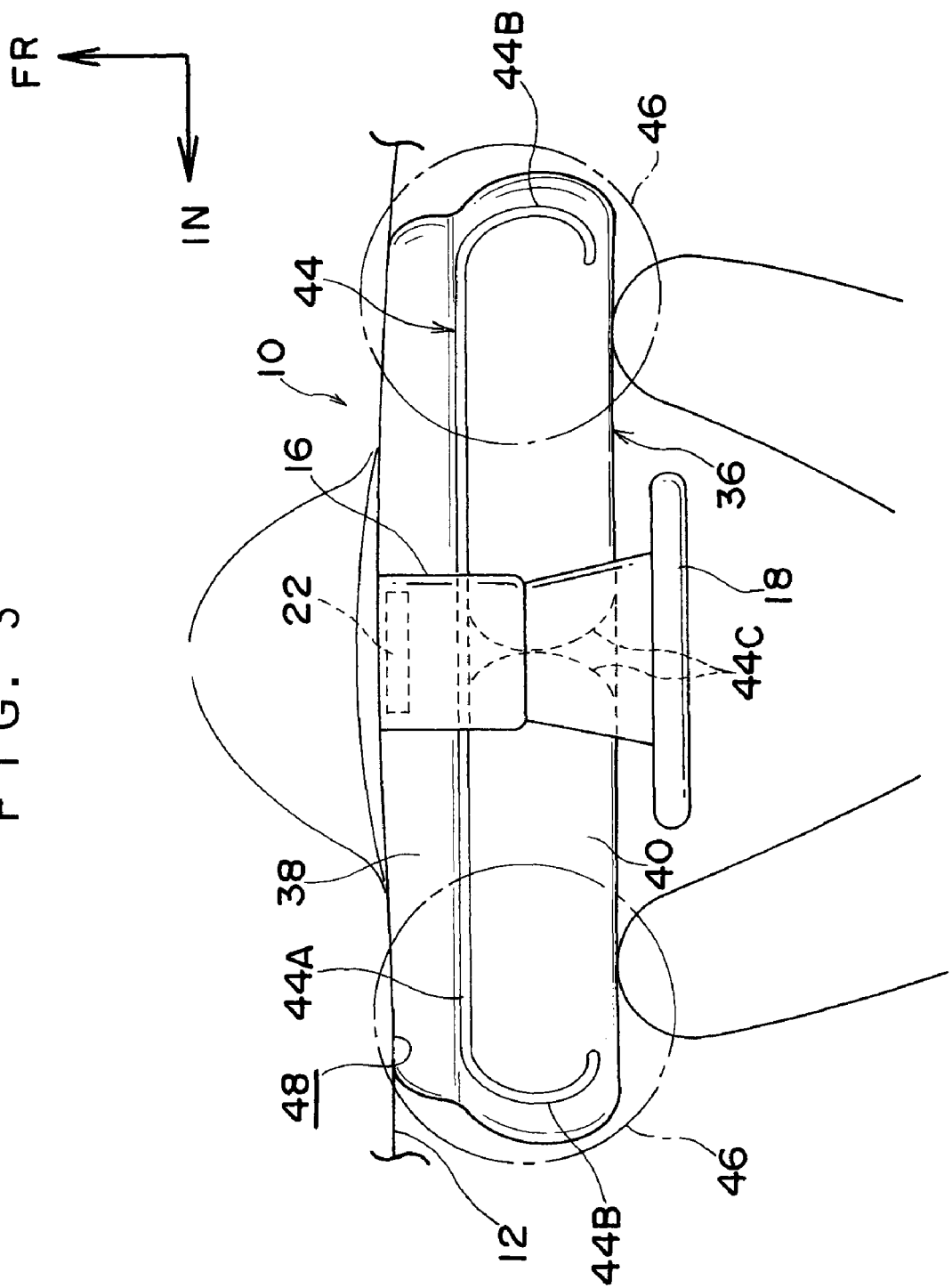
FIG. 3 is a plan view showing the vehicle knee airbag device shown in FIG. 1 in an actuated state.

FIG. 1 shows a side view of a vehicle knee airbag device 10 according to the embodiment in an actuated state. FIG. 2 shows a perspective view of the vehicle knee airbag device 10 according to the embodiment in an actuated state. FIG. 3 shows a plan view of a vehicle knee airbag device 10 according to the embodiment in an actuated state.

As shown in the figures, a steering column 16 is provided at a driver seat 14 side of a vehicle instrument panel 12. A steering wheel 18 is rotatably supported at steering column 16. A vehicle knee airbag device 10 is stored at a lower portion side of a column cover 20 of steering column 16.

Vehicle knee airbag device 10 includes, as main portions thereof, an inflator 22 as a gas supply means that actuates in a frontal collision, and a knee airbag 36, which is normally stored in a folded state in a column cover 20 and which deploys to a pillow shape in a vehicle lateral direction at a lower side of steering column 16 upon receiving a supply of gas from inflator 22. At a lower portion side of column cover 20, a cover 26 is provided that breaks and develops as a result of the operation thereon by a predetermined bag inflation pressure. The cover 26 may develop in a vehicle front-rear direction or a vehicle lateral direction. Further, the cover 26 may develop as a single opening or as two openings.

As shown in FIGS. 1 and 2, the above-described knee airbag 36 includes a first inflation portion 38 as a gas flow path that inflates and deploys in a vehicle lateral direction at an instrument panel 12 side, and second inflation portion 40 that communicates with first inflation portion 38 and that inflates and deploys in a vehicle lateral direction at a vehicle occupant knee side. Thus, first inflation portion 38 is disposed at a vehicle front side, and second inflation portion 40 is disposed at a vehicle rear side. Inflator 22 is disposed taking a vehicle lateral direction as a length direction thereof. A gas supply opening 42 (see additional figure in FIG. 1) leading from inflator 22 is disposed at a first inflation portion 38 side. Since the additional figure shows a longitudinal sectional structure of knee airbag 36 at the position of inflator 22, the shape of knee airbag 36 shown therein differs slightly from the side shape thereof shown in FIG. 1.

Figure 4:
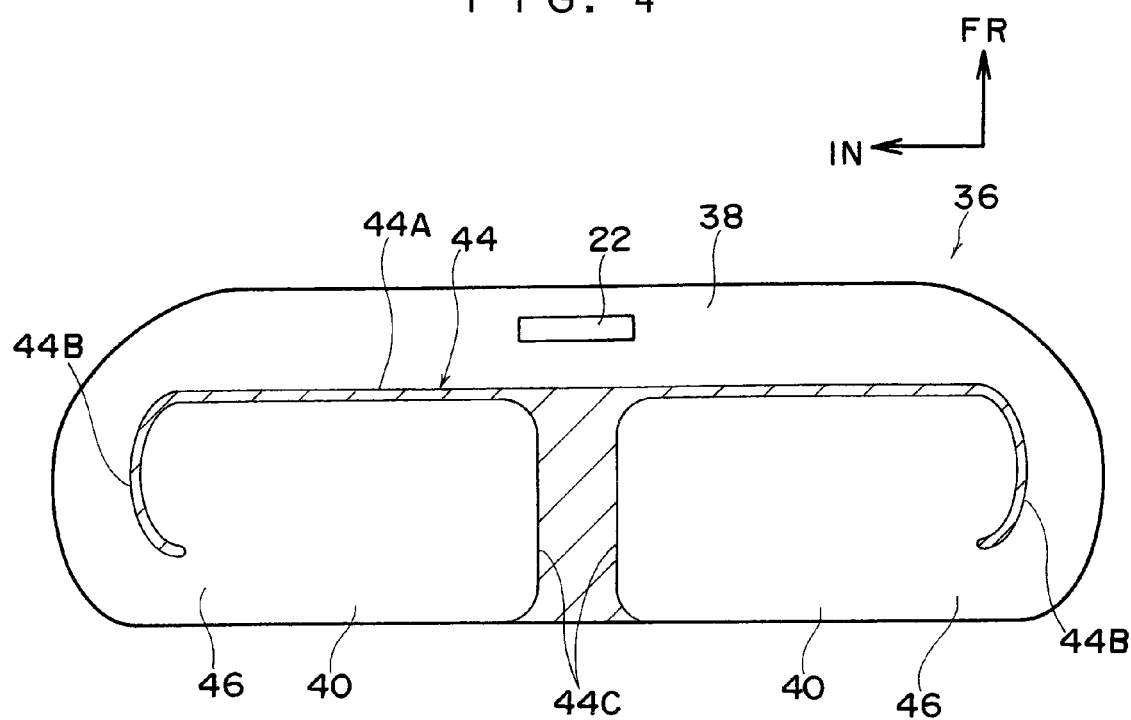
FIG. 4 is a schematic front view of the vehicle knee airbag device shown in FIG. 1 as seen from an axial direction of the steering column.
Figure 5:
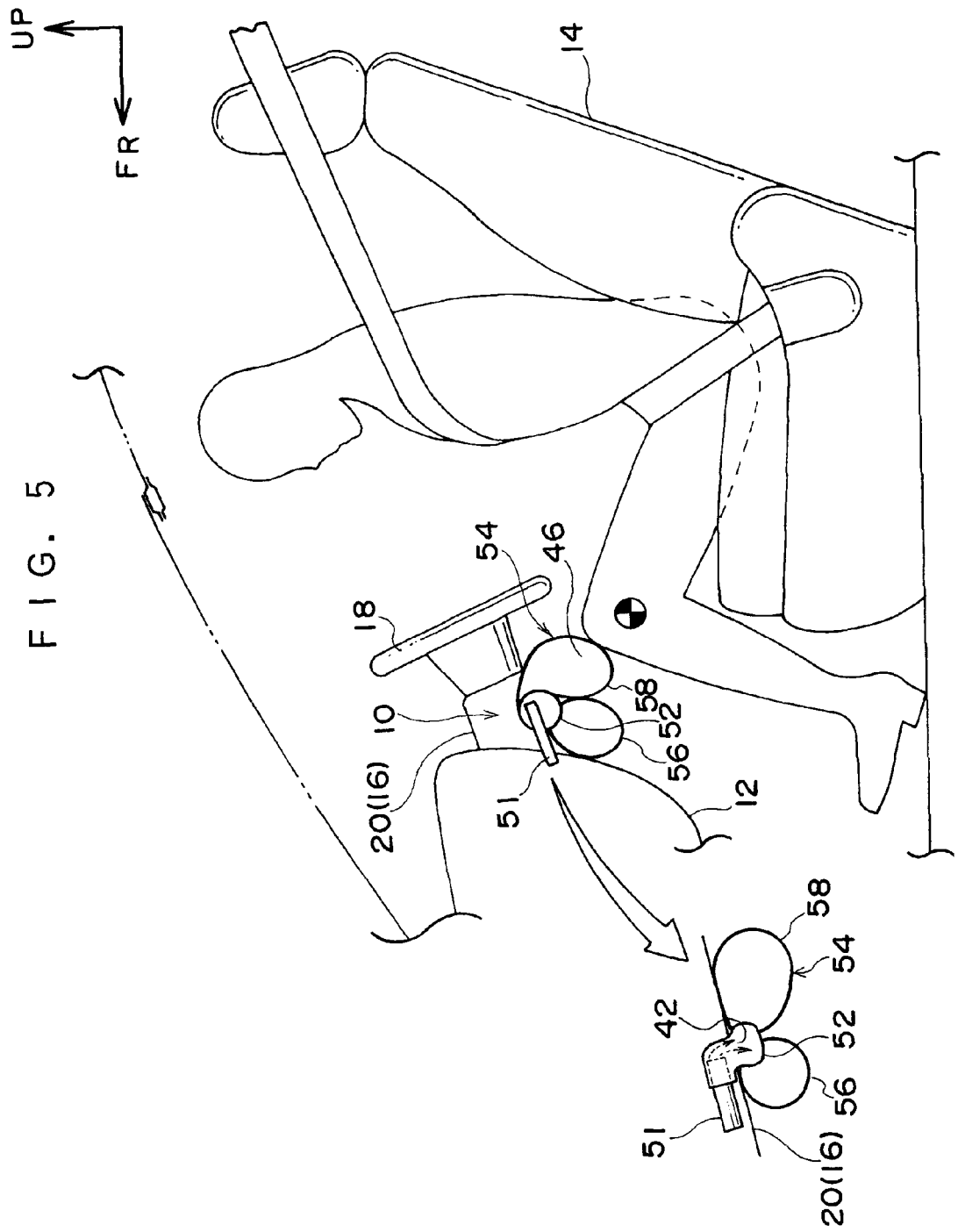
FIG. 5 is a side view showing the vehicle knee airbag device attached to a column according to a second embodiment in an actuated state.
Figure 6:
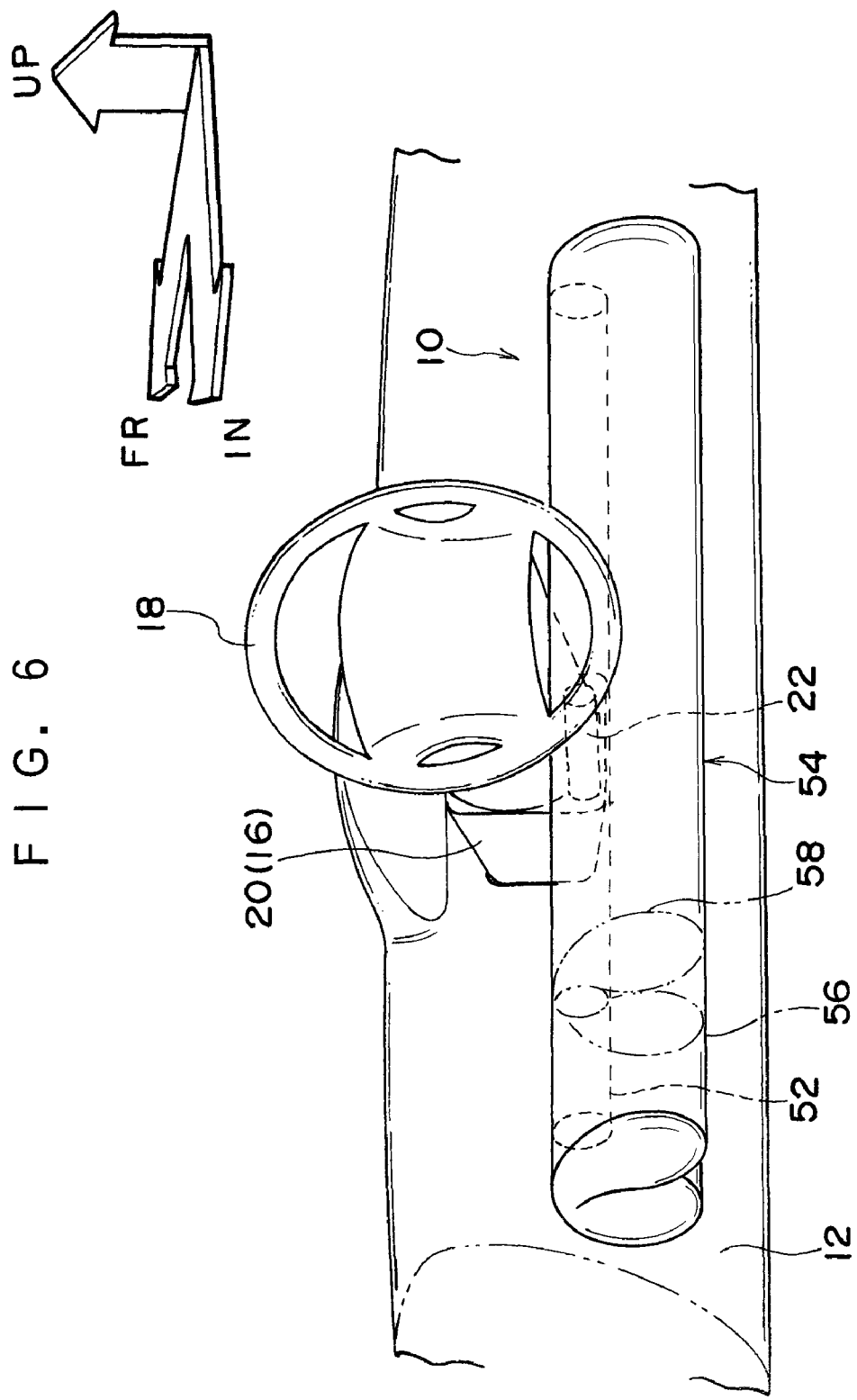
FIG. 6 is a perspective view showing the vehicle knee airbag device shown in FIG. 5 in an actuated state.
Figure 7:
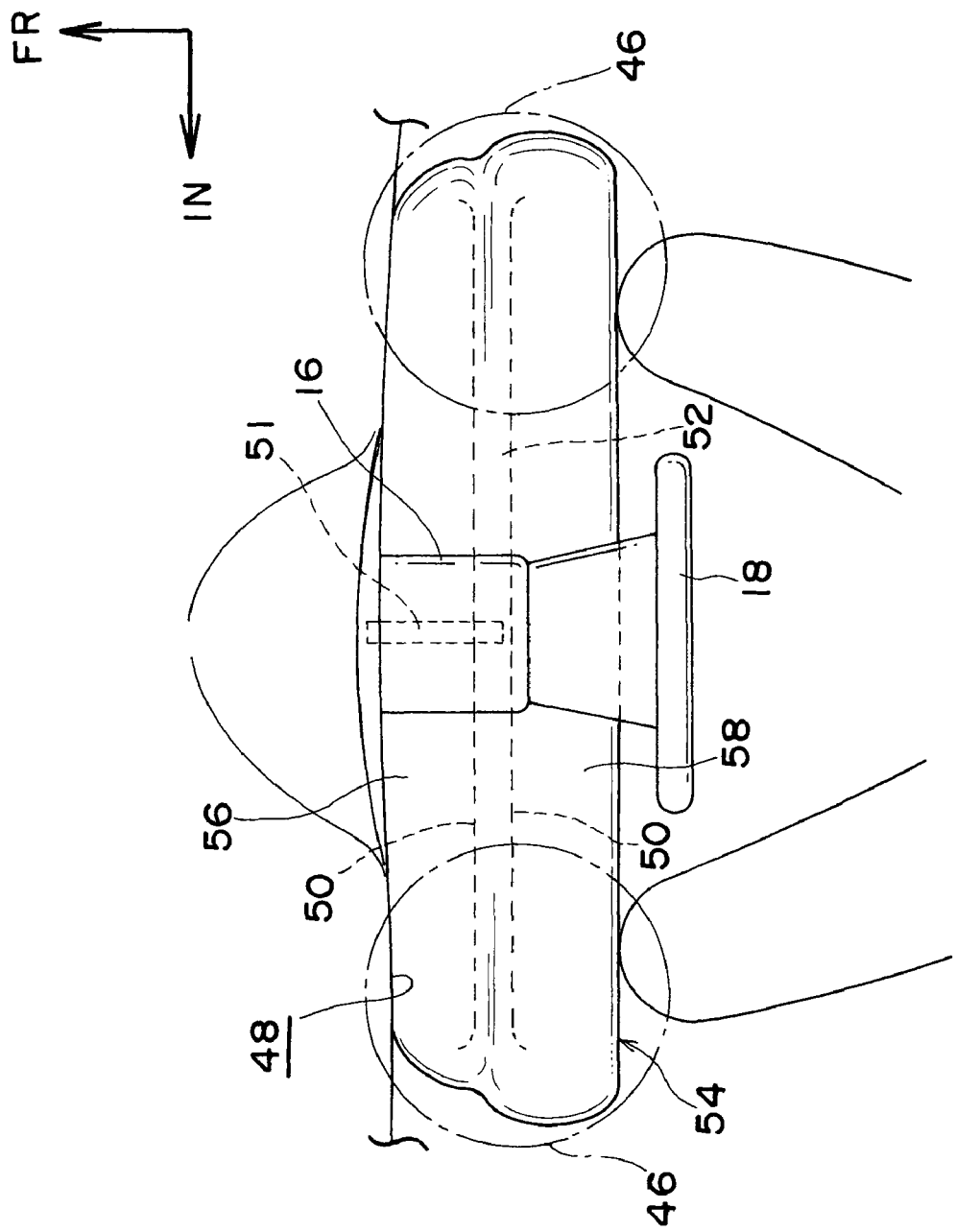
FIG. 7 is a plan view showing the vehicle knee airbag device shown in FIG. 5 in an actuated state.

FIG. 4 shows a front view of knee airbag 36 as seen from an axial direction of steering column 16. As shown in this figure, knee airbag 36 is formed as a pillow shaped bag by stitching together outer peripheral portions of two base cloths. In the vicinity of a central portion in a front-rear direction of knee airbag 36, a stitched portion 44 extends along a vehicle lateral direction. Stitched portion 44 includes a first stitched portion 44A which extends in a vehicle lateral direction at an inflator 22 side (a column side), second stitched portions 44B at length direction ends of first stitched portion 44A which respectively curve in substantially arc shapes towards a side opposite the inflator, and third stitched portions 44C which extend from a center portion in a vehicle lateral direction of first stitched portion 44A towards a side opposite the inflator.

Since the above-described stitched portion 44 is provided to knee airbag 36, knee airbag 36 has, as stated above, first inflation portion 38 that inflates and deploys in a vehicle lateral direction at instrument panel 12, and second inflation portion 40 that inflates and deploys in a vehicle lateral direction at a vehicle occupant knee side. The portion of FIG. 4 shown with diagonal lines indicates an area where gas does not flow. Both end portions in a length direction of knee airbag 36 are respectively a pair of left and right protection portions 46 (the portions encircled by dot-dashed lines in FIG. 3) that receive and stop the knees of an occupant. Thus, gas supply opening 42 leading from inflator 22 disposed at first inflation portion 38, which is a gas flow path, and the pair of protection portions 46, are arranged on substantially the same straight line in a vehicle lateral direction via first inflation portion 38.

Operation and Effects of the Present Embodiment

The operation and effects of the present embodiment will next be explained.

In a frontal collision, a seated vehicle occupant moves under inertia towards a vehicle front side. Thus, the knees of the occupant become relatively closer to instrument panel 12 of a vehicle, and the space 48 (see FIG. 1) between the instrument panel 12 and the knees becomes smaller.

Meanwhile, in a frontal collision, the frontal collision is detected by an airbag sensor (not shown) and a collision signal is output to a controller (not shown). Based on the input collision signal, the controller determines whether or not a frontal collision has occurred, and if it determines that a frontal collision has occurred, it applies a predetermined current to inflator 22. Thereby, inflator 22 actuates, and gas flows to within knee airbag 36 which is in a folded state. As a result, a predetermined bag inflation pressure operates on cover 26 of column cover 20, which breaks and develops, and knee airbag 36 inflates and deploys to between instrument panel 12 and the knees of a vehicle occupant.

In this embodiment, when knee airbag 36 is in a state of complete inflation and deployment, the pair of protection portions 46, which inflate and deploy at both sides of steering column 16 and which protect the knees of a vehicle occupant, are mutually communicated via first inflation portion 38 provided at an instrument panel 12 side, and since gas supply opening 42 leading from inflator 22 is provided at first inflation portion 38, when gas is supplied from inflator 22, the gas flows from gas supply opening 42 to first inflation portion 38, and subsequently flows in a vehicle lateral direction, and inflates the pair of protection portions 46. Moreover, since gas supply opening 42 and the pair of protection portions 46 are arranged on substantially the same straight line in a vehicle lateral direction via first inflation portion 38, the pair of protection portions 46 and gas supply opening 42 are linked at substantially the shortest possible distance to each other. Therefore, in a frontal collision, the pair of protection portions 46 of knee airbag 36 can be quickly interposed in the small space 48 between instrument panel 12 and the knees of a vehicle occupant.

In other words, in the present embodiment, as a result of first inflation portion 38 being disposed at an instrument panel 12 side, the pair of protection portions 46 mutually communicate, and in a frontal collision, the pair of protection portions 46 are instantly sent to a small space 48 between instrument panel 12 and the knees of a vehicle occupant via first inflation portion 38, where they inflate and deploy, and subsequently, second inflation portion 40 of knee airbag 36 is inflated and deployed.

As described above, according to vehicle knee airbag device 10 and the method of deploying a vehicle knee airbag according the present embodiment, knee airbag 36 attached to a steering column can be inflated and deployed quickly at small space 48 between instrument panel 12 and the knees of a vehicle occupant in a frontal collision.

Further, as shown in FIG. 1. and the like, when knee airbag 36 is in a state of complete inflation and deployment, and the knees of a vehicle occupant strike the pair of protection portions 46, second inflation portion 40 meets resistance at first inflation portion 38, which is supported by steering column 16 and instrument panel 12, and thus receives and stops the knees of the vehicle occupant.

Second Embodiment

Below, a second embodiment of the vehicle knee airbag device according to the invention will be described using FIGS. 5-8. Further, structural parts identical to those of the first embodiment described above are indicated by the same numbers, and descriptions thereof are omitted.

Figure 8:
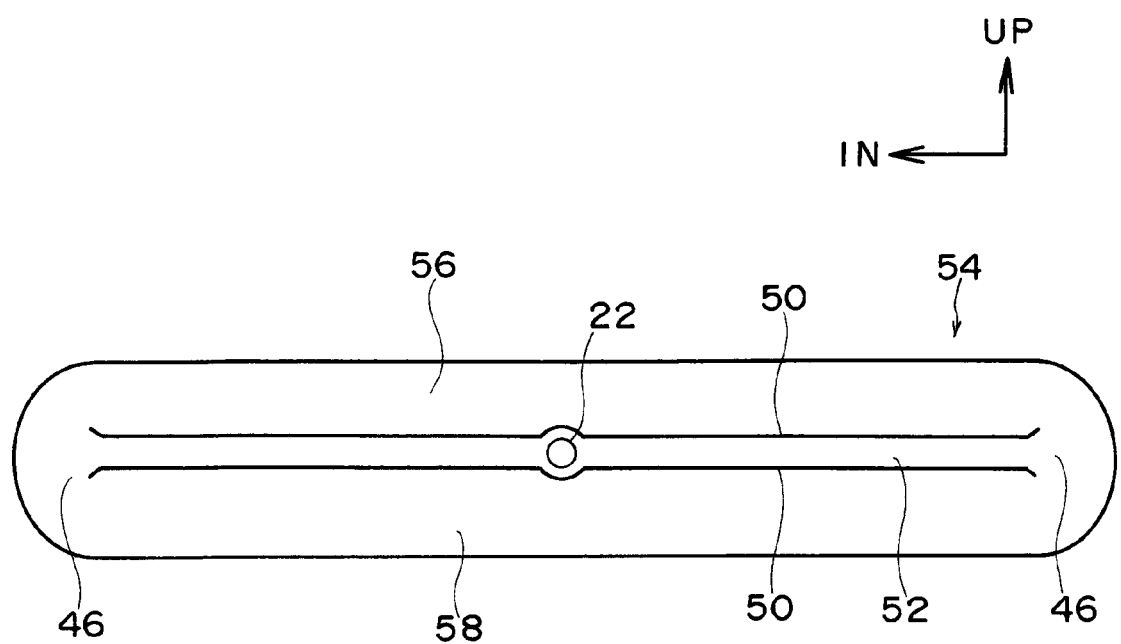
FIG. 8 is a schematic front view of the knee airbag device shown in FIG. 5 as seen from an axial direction of the steering column.

As shown in these figures, in vehicle knee airbag device 10 according to the present embodiment, an inflator 51 is of a longitudinally positioned type (a type disposed in an axial direction of steering column 16) and is disposed in column cover 20. As shown in FIG. 8, in the vicinity of a central portion in a vehicle vertical direction (or in a vehicle front-rear direction) of a pair of base cloths of a knee airbag 54, two seam portions 50 are arranged in parallel along a vehicle lateral direction. A space partitioned by seam portions 50 is a gas flow path 52, which extends in a vehicle lateral direction. At a central portion in a length direction of gas flow path 52, one end portion of inflator 51 is connected such that gas supply is possible. Further, since gas flow path 52 is formed in the vicinity of a central portion of two base cloths of knee airbag 54, knee airbag 54 is provided with, taking gas flow path 52 as boundaries thereof, a first inflation portion 56, which inflates and deploys in a vehicle lateral direction at an instrument panel 12 side, and a second inflation portion 58, which inflates and develops in a vehicle lateral direction at a vehicle occupant knee side. Further, at both length direction ends of gas flow path 52 the above-described pair of protection portions 46 are disposed; therefore, gas supply opening 42 and the pair of protection portions 46 are arranged on substantially the same straight line in a vehicle lateral direction via gas flow path 52.

Operation and Effects

As a result of the above configuration, in a frontal collision, when inflator 51 activates and column cover 20 develops, gas supplied from inflator 51 is supplied from gas supply opening 42 to gas flow path 52. As a result, gas flows through gas flow path 52 and gas flow path 52 is made to inflate in a pipe shape along a vehicle lateral direction, while the pair of protection portions 46 positioned at both ends thereof inflate and deploy. Subsequently, gas circulates from both ends of gas flow path 52 to first inflation portion 38 and second inflation portion 40, and first inflation portion 38 inflates and deploys in a vehicle lateral direction at instrument panel 12, and second inflation portion 40 inflates and deploys in a vehicle lateral direction at a vehicle occupant knee side.

Thus, in the present embodiment, as with the first embodiment, firstly, gas is supplied from gas supply opening 42 to gas flow path 52, and gas flow path 52 is quickly inflated in a pipe shape along a vehicle lateral direction, and simultaneously at both ends thereof, the pair of protection portions 46 are inflated; thereby, protection portions 46 can be instantly interposed between instrument panel 12 and the knees of a vehicle occupant. Further, gas supply opening 42 and the pair of protection portions 46 are arranged on substantially the same straight line in a vehicle lateral direction via gas flow path 52; thereby, the gas supply opening 42 and the pair of protection portions 46 are linked by the substantially the shortest possible distance. As a result, in a frontal collision, the pair of protection portions 46 of knee airbag 54 can be quickly interposed to small space 48 between instrument panel 12 and the knees of a vehicle occupant.

Further, by reducing the inner diameter of gas flow path 52 upon inflation thereof, the pair of protection portions 46 can be inflated and deployed faster at the intended position.

Third Embodiment

Below, a third embodiment of the vehicle knee airbag device according to the invention will be described using FIGS. 9-11. Further, structural parts identical to those of the first embodiment described above are indicated by the same numbers, and descriptions thereof are omitted.

In the third embodiment, an inflator has a particular configuration, the effects of which may be obtained when used with the first embodiment, the second embodiment, and a fourth and following embodiments described below. Further, this third embodiment corresponds to an embodiment of the present invention according to claim 12 and claim 13.

Figure 9A:
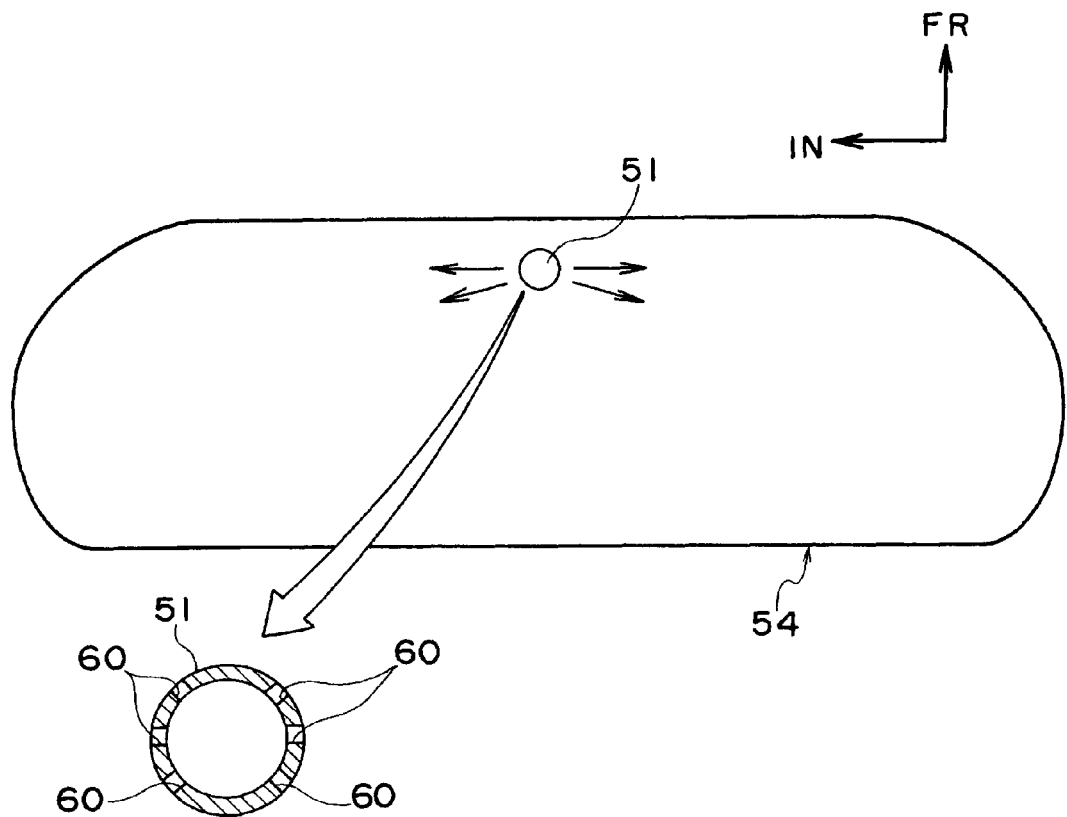
FIG. 9A is a front view showing an embodiment in which an inflator is arranged perpendicular to a knee airbag, according to a third embodiment.
Figure 9B:
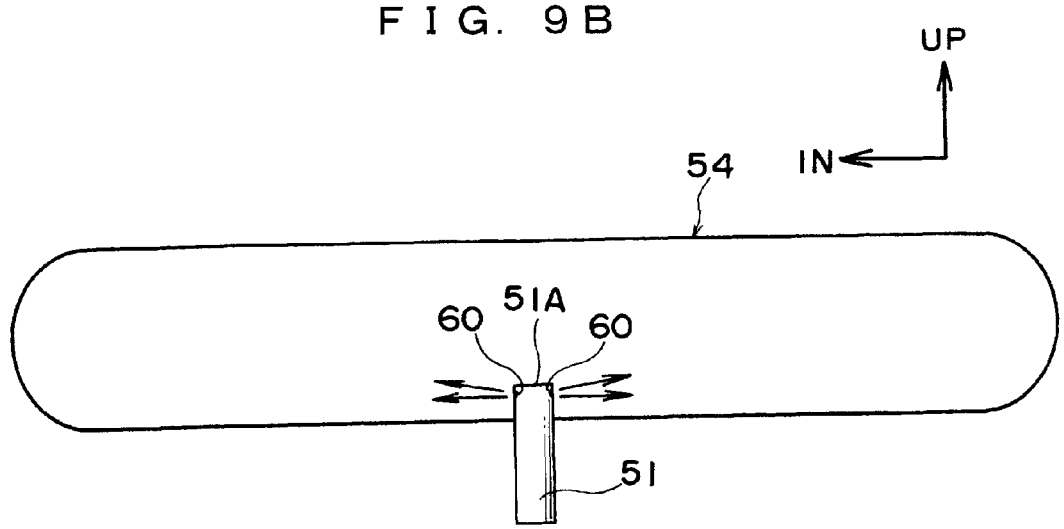
FIG. 9B is a plan view showing an embodiment in which an inflator is arranged perpendicular to a knee airbag, according to a third embodiment.

In the embodiment shown in FIGS. 9A and 9B, inflator 51 is disposed perpendicular to knee airbag 54 (see the second embodiment), and only one end portion 51A in a length direction of inflator 51 is disposed inserted in knee airbag 54. For this reason, gas ejection holes 60 are formed at both sides in a radial direction of only end portion 51A which is inserted into knee airbag 54 (see the additional figure to FIG. 9A). According to the above-described configuration, when inflator 51 actuates, gas is ejected from plural gas ejection holes 60, formed at a peripheral wall portion of end portion 51A at one end in a length direction of inflator 51, towards both of an inner side and an outer side in a vehicle lateral direction.

Figure 10A:
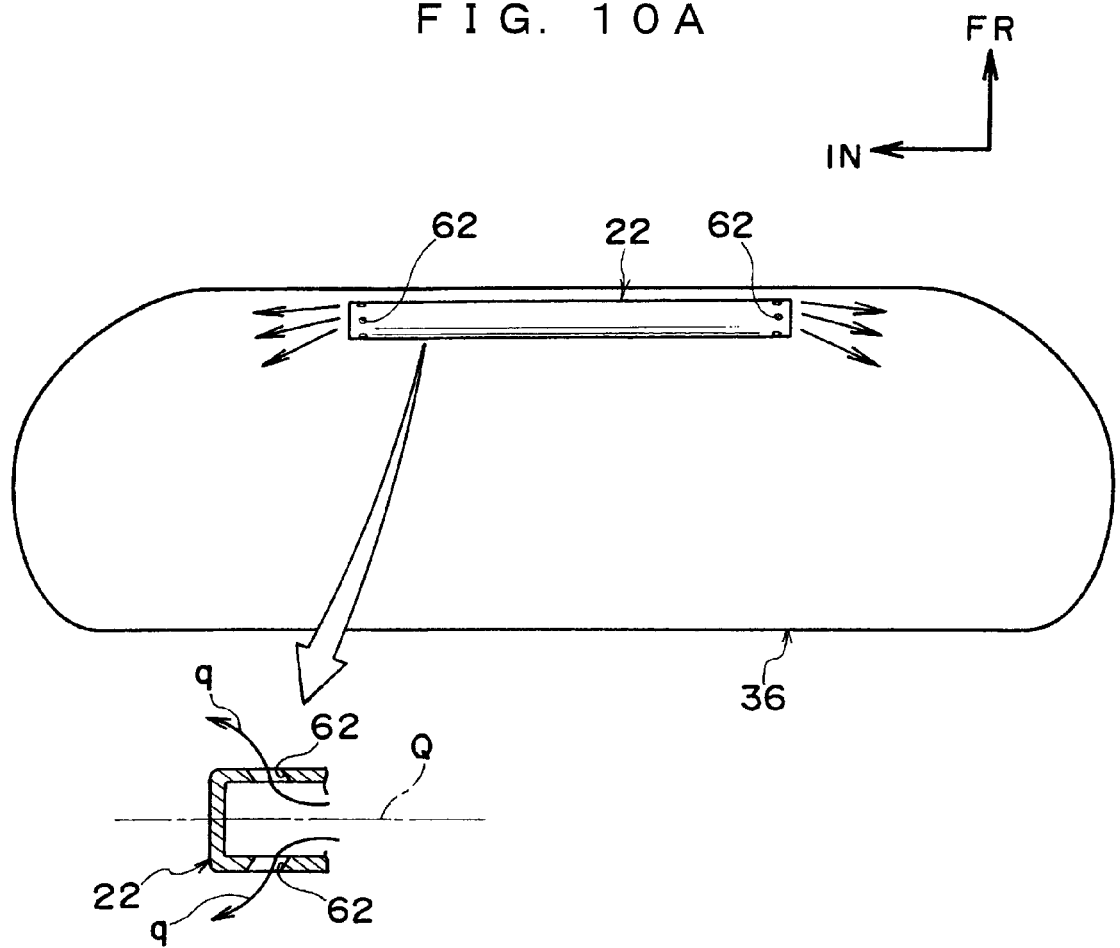
FIG. 10A is a front view showing an embodiment in which an inflator is arranged parallel to a knee airbag, according to a third embodiment.
Figure 10B:
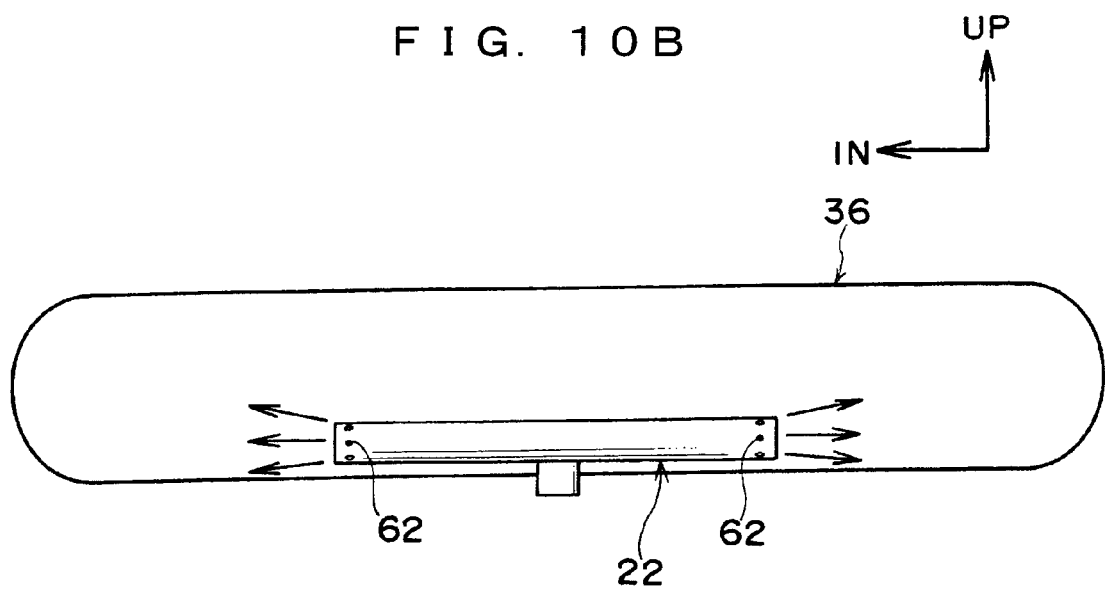
FIG. 10B is a plan view showing an embodiment in which an inflator is arranged parallel to a knee airbag, according to a third embodiment.

In the embodiment shown in FIGS. 10A and 10B, inflator 22 is arranged parallel (in a vehicle lateral direction) to knee airbag 36 (see the first embodiment). At peripheral portions of both ends in a length direction of inflator 22, plural gas ejection holes 62 are formed. As shown enlarged in the additional figure to FIG. 10A, gas ejection holes 62 are formed as tapered holes inclining at a predetermined angle with respect to an axis line Q. According to the above configuration, when inflator 22 actuates, since plural gas ejection holes 62 formed at the peripheries of both ends in a lateral direction thereof are tapered holes, gas is not ejected in a radial direction of inflator 22, but is ejected in a direction intersecting an axial direction (at an outer and inner side in a vehicle lateral direction) (the flow of gas is indicated by arrow q). Therefore, gas is efficiently sent in left and right directions of (first inflation portion 38 of) knee airbag 36.

Figure 11A:
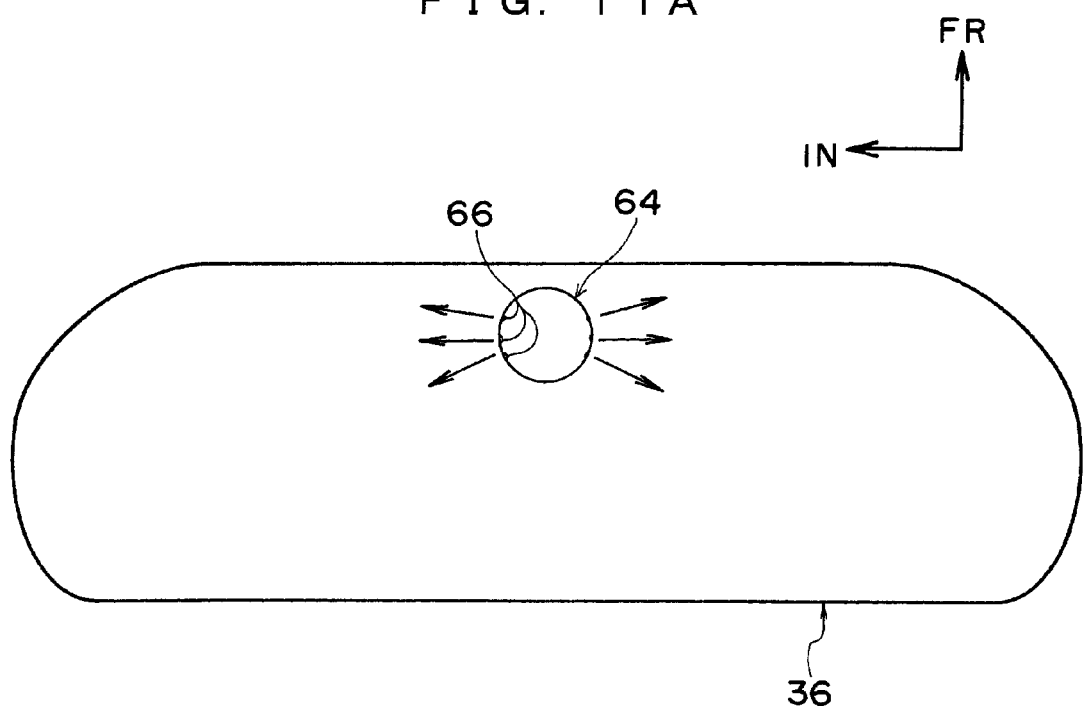
FIG. 11A is a front view showing an embodiment that uses an inflator of a driver's seat airbag device, according to a third embodiment.
Figure 11B:
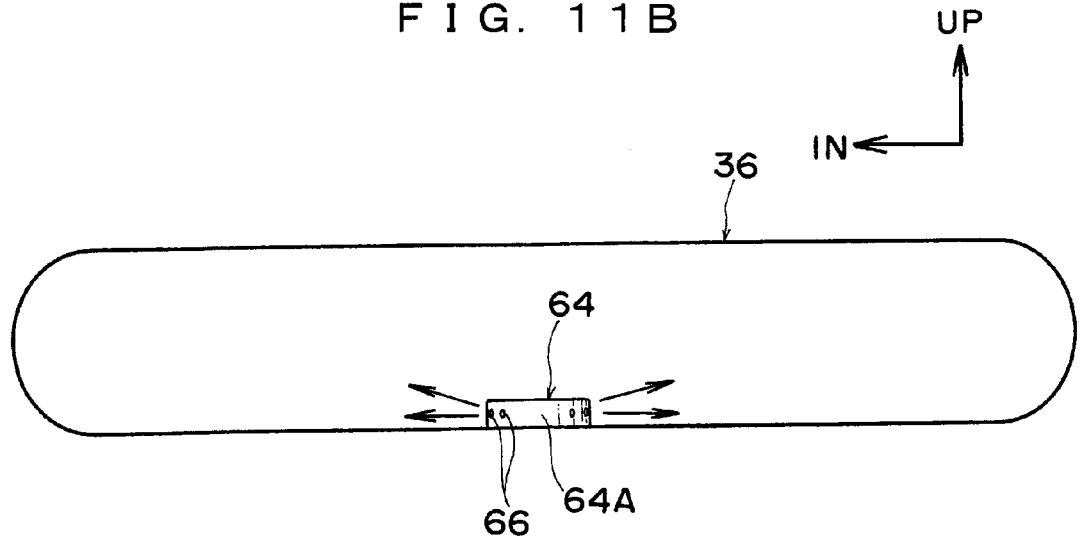
FIG. 11B is a plan view showing an embodiment that uses an inflator of a driver's seat airbag device, according to a third embodiment.

The embodiment shown in FIGS. 11A and 11B uses a flat substantially circular inflator 64 used with a driver's seat airbag device with respect to knee airbag 36. Here, in a similar manner to inflator 51 of FIG. 9, gas ejection holes 66 are formed only at both sides in a radial direction (a vehicle lateral direction outer side and inner side) of peripheral portion 64A.

Fourth Embodiment

Next, a fourth embodiment of the vehicle knee airbag device according to the invention will be described with reference to FIGS. 12-14. Further, structural parts identical to those of the first embodiment described above are indicated by the same numbers, and descriptions thereof are omitted.

The fourth embodiment is includes an inner duct 72 provided as a gas flow path in knee airbag 70.

Figure 12A:
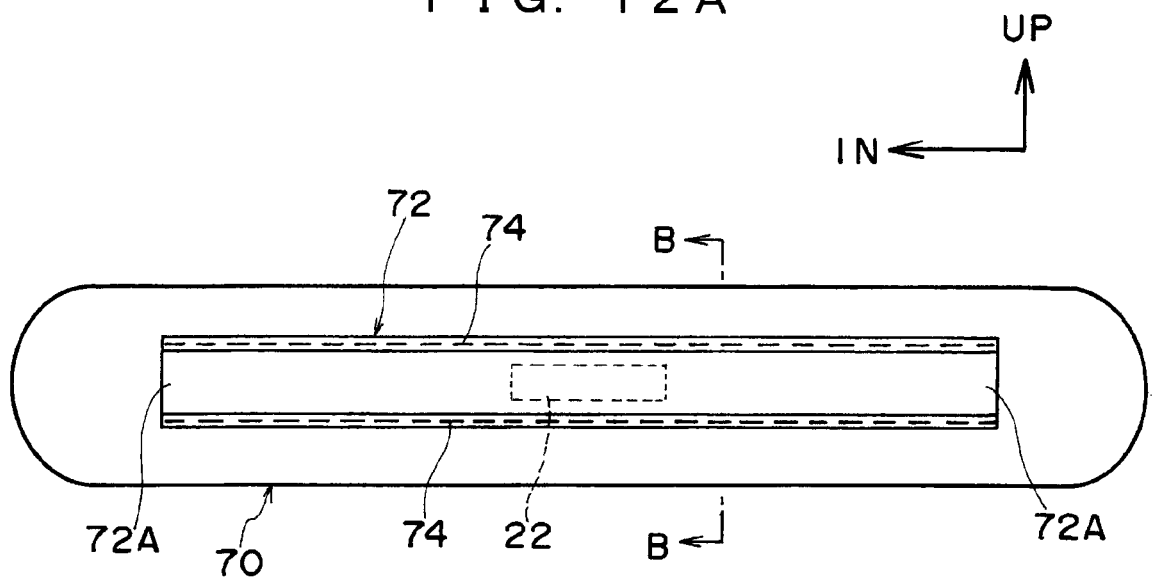
FIG. 12A is a schematic front view corresponding to FIG. 4, showing an embodiment in which a straight inner duct is provided in a knee airbag, according to a fourth embodiment.
Figure 12B:
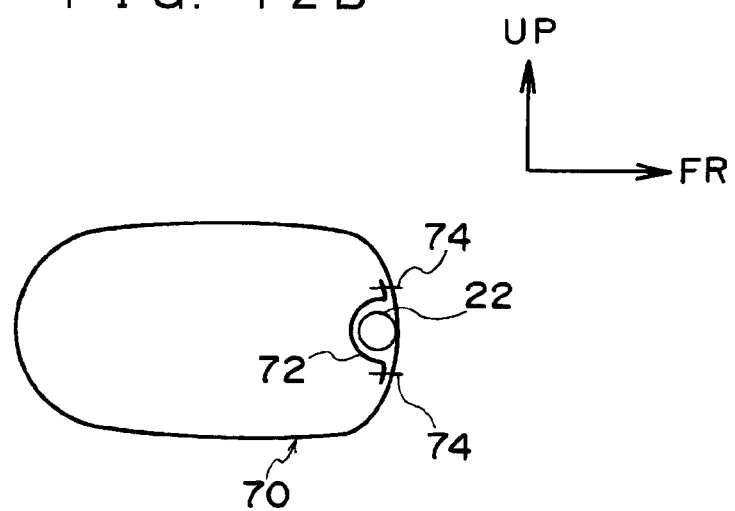
FIG. 12B is a longitudinal sectional view along line B-B of FIG. 12A which corresponds to FIG. 4, showing an embodiment in which a straight inner duct is provided in a knee airbag, according to a fourth embodiment.

The embodiment shown in FIGS. 12A and 12B is provided with a belt shape inner duct 72, which is disposed at a face of an instrument panel 12 side (steering column 16 side) in knee airbag 70, and which takes a vehicle lateral direction as a length direction thereof. Inner duct 72 is attached to knee airbag 70 by stitching an upper edge and a lower edge (stitched portion 74) of a cloth cut in a belt shape. Both end portions 72A in a length direction of inner duct 72 are not stitched and are open.

According to the above configuration, when gas is supplied from inflator 22, gas is first supplied to inner duct 72 along a length direction thereof. As a result, a pair of protection portions 46 disposed at respective end portions 72A in a length direction of inner duct 72 inflate. Subsequently, gas is dispersed at, and inflates, the entire knee airbag 70. Therefore, in a similar manner to the above-described embodiments, as a result of the provision of inner duct 72, gas is supplied first to inner duct 72, then guided by inner duct 72 so as to instantly inflate the pair of protection portions 46, allowing the pair of protection portions 46 to be interposed at space 48 between instrument panel 12 and the knees of a vehicle occupant.

Figure 13:
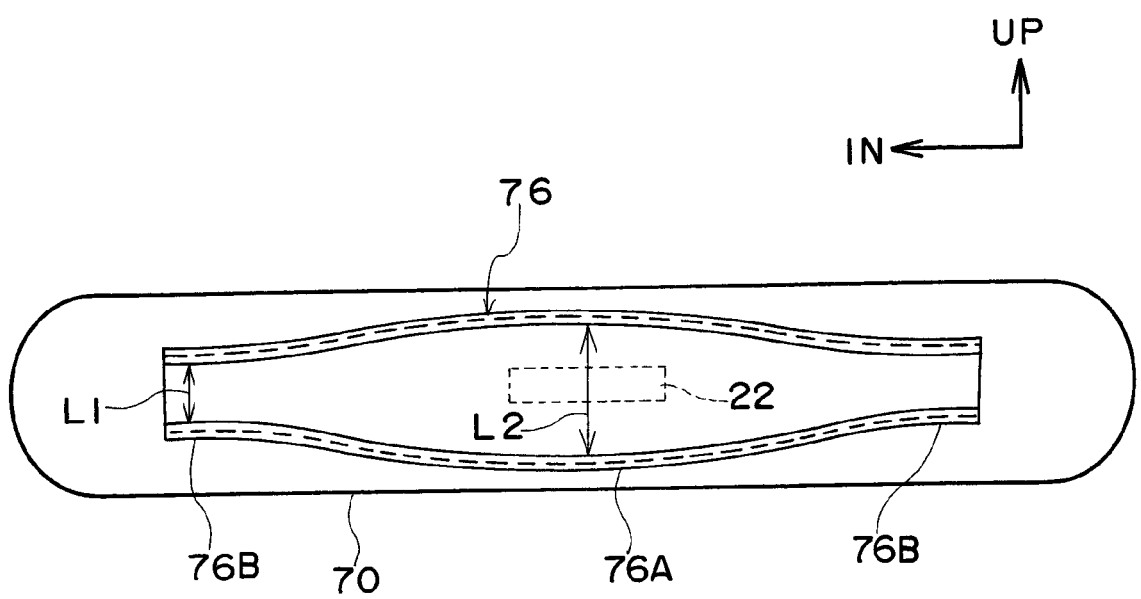
FIG. 13 is a schematic front view corresponding to FIG. 12A, showing an embodiment in which an inner duct that bulges in the center is provided in a knee airbag, according to a fourth embodiment.

In the embodiment shown in FIG. 13, an inner diameter L2 at a central portion 76A in a length direction of the above-described inner duct 76 is larger than an inner diameter L1 at respective end portions 76B also in a length direction thereof.

The basic operation of this embodiment is similar to that of knee airbag 70 shown in FIG. 12; however, in this embodiment, by first inflating a central portion in a length direction 76A, positioned directly under steering column 16, a protection area with respect to steering column 16 is ensured (enlarged), and following this the pair of protection portions 46 to the left and right are inflated.

Figure 14A:
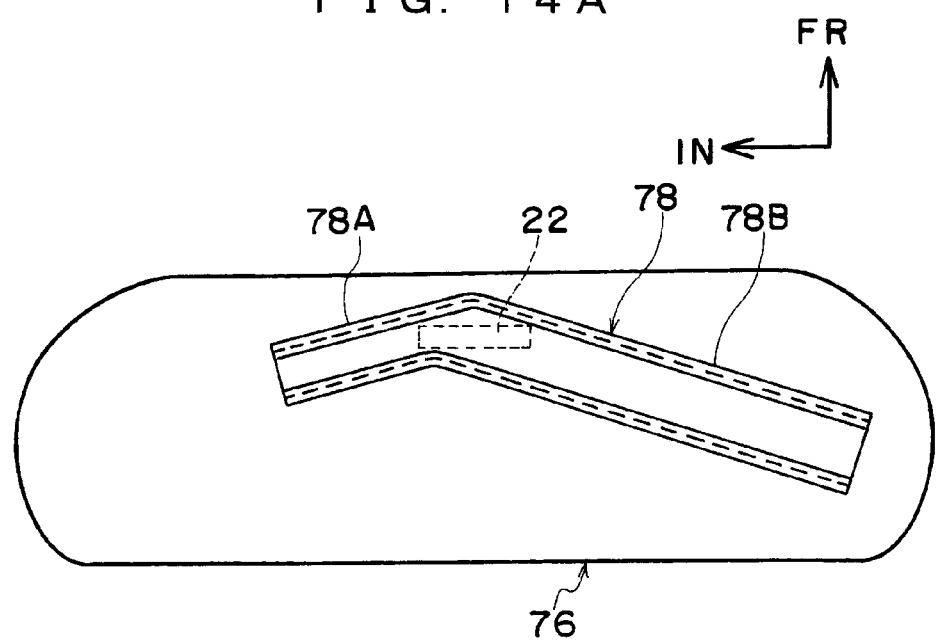
FIG. 14A is a schematic front view corresponding to FIG. 12A, showing an embodiment in which an inner duct having an "L" shape is provided in a knee airbag, according to a fourth embodiment.
Figure 14B:
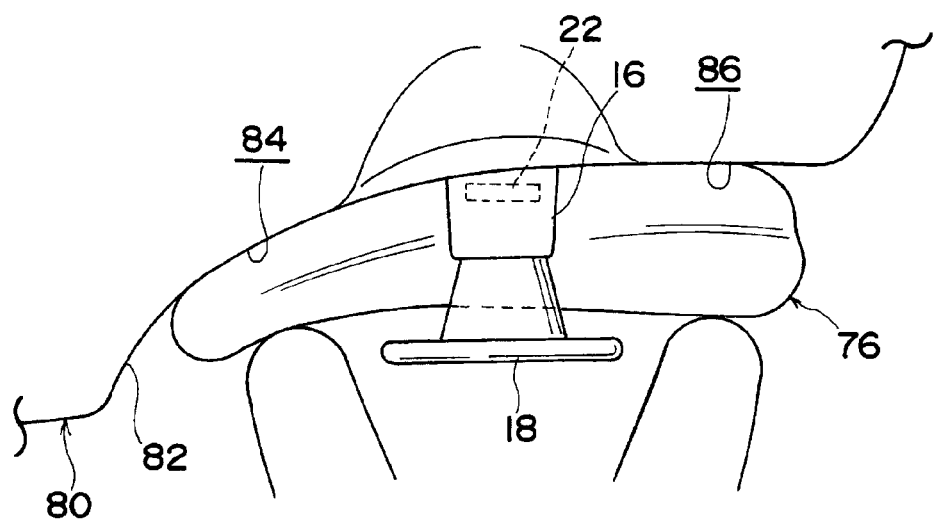
FIG. 14B is a plan view showing the relationship to an instrument panel of an embodiment in which an inner duct having an "L" shape is provided in a knee airbag, according to a fourth embodiment.

In the embodiment shown in FIGS. 14A and 14B, inner duct 78 is formed to have an shape resembling the letter "L" in a front view. In other words, inner duct 78 includes a short end portion 78A and a long end portion 78B, and the short end portion 78A is disposed at an inner side in a vehicle lateral direction, and the long end portion 78B is disposed at an outer side in a vehicle lateral direction. Further, the inner diameter of short end portion 78A is more constricted than (configured to be smaller than) the inner diameter of long end portion 78B.

According to the above configuration, as shown in FIG. 14B, depending on the kind of car, the shape (design) of an instrument panel 80 may be rounded at a position where steering column 16 is disposed, in plan view. When this design is adopted, generally, a rounded portion 82 is provided such that an inner side thereof in a vehicle lateral direction is less dug-out in a vehicle front-rear direction than an outer side thereof in a vehicle lateral direction. Therefore, space 84, which is between an inner side in a vehicle lateral direction of rounded portion 82 and the knees of a vehicle occupant, is smaller than space 86, which is between an outer side in a vehicle lateral direction and the knees of a vehicle occupant.

Here, if knee airbag 70 having the above-described inner duct 78 is adopted for an instrument panel 80 having this kind of design, then upon gas being supplied from inflator 22, since the short end portion 78A side is shorter than long end portion 78B side, and the diameter thereof is also smaller, it can inflate to its extremities within an extremely short time. Therefore, the pair of protection portions 46 at an inner side in a vehicle lateral direction can appropriately inflate and deploy between instrument panel 80 and the knees of a vehicle occupant, even to space 84 which has been reduced in size. Further, long end portion 78B inflates longer at an outer side in a vehicle lateral direction, and more in a vehicle front-rear direction, according to how much longer, and how much greater the diameter is, than short end portion 78A, and protection portion 46 at a vehicle lateral direction outer side inflates and deploys correspondingly to a large extent. In other words, protection portions 46 can be formed to be well-balanced according to the dimensions of the spaces 84 and 86 to the left and right.

Regarding the above-described embodiments shown in FIGS. 12-14, a configuration is described in which inner ducts 72, 76 and 78 are disposed at a column side of knee airbag 70. The "inner duct" of the invention according to claim 7 indicates, like these embodiments, an element which is open at both ends in a lateral direction, and "inner bag" indicates an element in which the inner ducts 72, 76 and 78 are respectively closed at both ends thereof in a lateral direction to form a single chamber (room), with circular openings or the like formed at necessary positions thereof. Therefore, for example, when both ends 72A in a length direction of inner duct 72 are closed by stitching, and a predetermined number of openings having predetermined diameters are formed at both ends 72A in the length direction, such that protection portions 46 may be inflated, this configuration is no longer categorized as an "inner duct", but as an "inner bag".

Fifth Embodiment

Below, a fifth embodiment of the vehicle knee airbag device according to the invention will be described using FIG. 15. Further, structural parts identical to those of the first embodiment described above are indicated by the same numbers, and descriptions thereof are omitted.

Figure 15A:
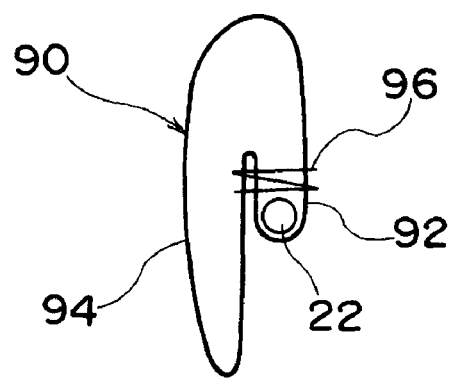
FIG. 15A is a longitudinal sectional view showing a knee airbag in a state before inflation according to a fifth embodiment.
Figure 15B:
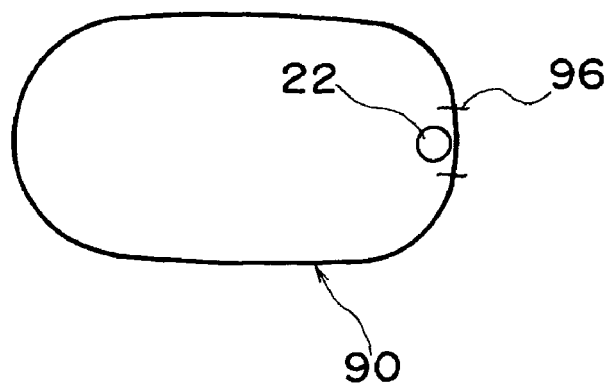
FIG. 15B is a longitudinal sectional view showing a knee airbag in a state after inflation according to a fifth embodiment.

As shown in FIGS. 15A and 15B, in the fifth embodiment, an inner duct 92 is configured using knee airbag 90 itself.

Specifically, by reversing (folding) a portion at an inflator 22 side of knee airbag 90 towards a main body portion 94 side thereof, and stitching with a tear seam 96 at the folded area, an inner duct 92 is formed at the column side.

According to the above configuration, when the inflator 22 actuates and gas is supplied to the inside of inner duct 92, inner duct 92 inflates in a pipe shape in a vehicle lateral direction and gas is simultaneously supplied to the pair of protection portions 46. As a result, the pair of protection portions 46 inflate and deploy to between instrument panel 12 and the knees of a vehicle occupant. Subsequently, when the inner pressure of inner duct 92, which operates upon tear seam 96, reaches a predetermined value, tear seam 96 breaks and it becomes integrated with main body portion 94, as shown in FIG. 15B.

Operation and effects similar to those of the fourth embodiment can also be achieved by the above embodiment. Additionally, since only a portion of knee airbag 90 is reversed and stitched, the number of components can be decreased, and costs can be reduced, compared to a case in which knee airbag 90 is provided with a separate inner duct. Further, there is the advantage that fine-tuning of the break strength of tear seam 96 can be easily performed.

Supplementary Explanation of Each of the Above Embodiments and Variations

Below, supplementary explanation of the above embodiments and variations will be described using FIGS. 16-22. Further, structural parts identical to those of the first embodiment described above are indicated by the same numbers, and descriptions thereof are omitted.

Conceptual View of the Concept of the Invention; Basic Form

Figure 16:
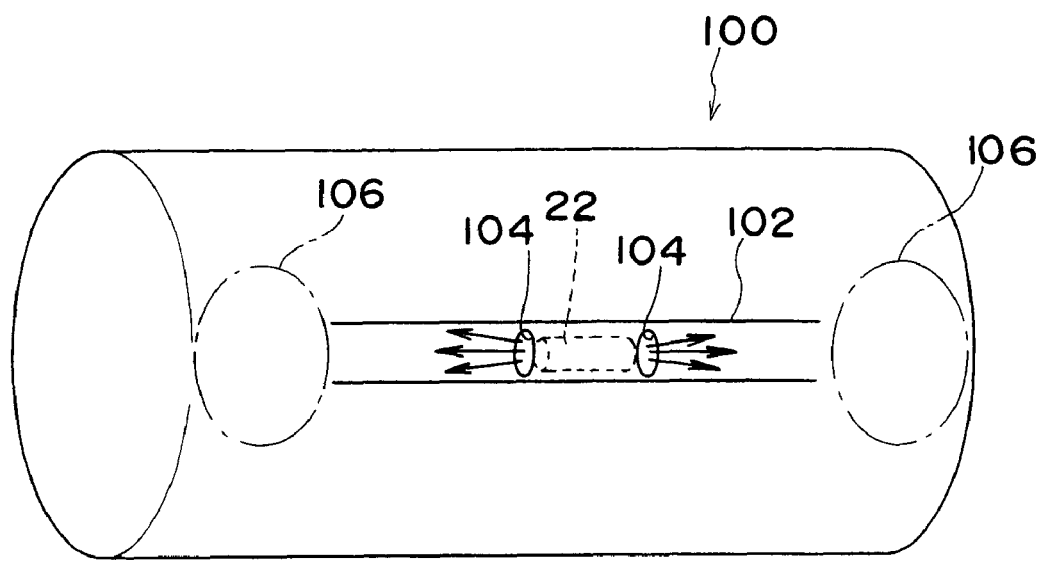
FIG. 16 is a schematic view of a knee airbag showing a conceptual view (a basic form) of the concept of the invention.

Knee airbag 100, shown in FIG. 16, is a model of the pillow shape knee airbag 36 described in the first embodiment. Here, first inflation portion 38 and second inflation portion 40 are illustrated without distinguishing between them (the following variations are similar in this respect), but in practice, in a similar manner to the first embodiment, first inflation portion 38 and second inflation portion 40 both exist.

As shown here, gas flow path 102, which is the core concept of the invention, is formed at an instrument panel 12 side at an inner portion of knee airbag 100, and extends in a vehicle lateral direction. At a central portion in a length direction of gas flow path 102, a pair of left and right gas supply openings 104 are formed, and gas supplied from the inflator 22 is supplied to both the left and right sides from gas supply openings 104. Gas supply openings 104 and the left and right pair of protection portions 106 are arranged (communicate) on substantially the same straight line in a vehicle lateral direction via gas flow path 102.

Variation 1

Figure 17A:
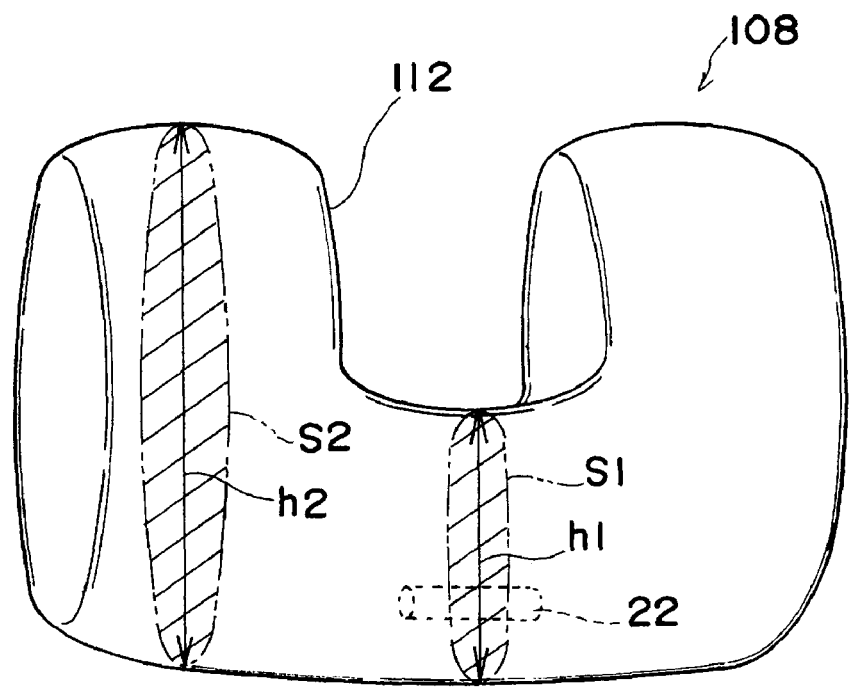
FIG. 17A is a schematic view of a knee airbag according to variation 1.
Figure 17B:
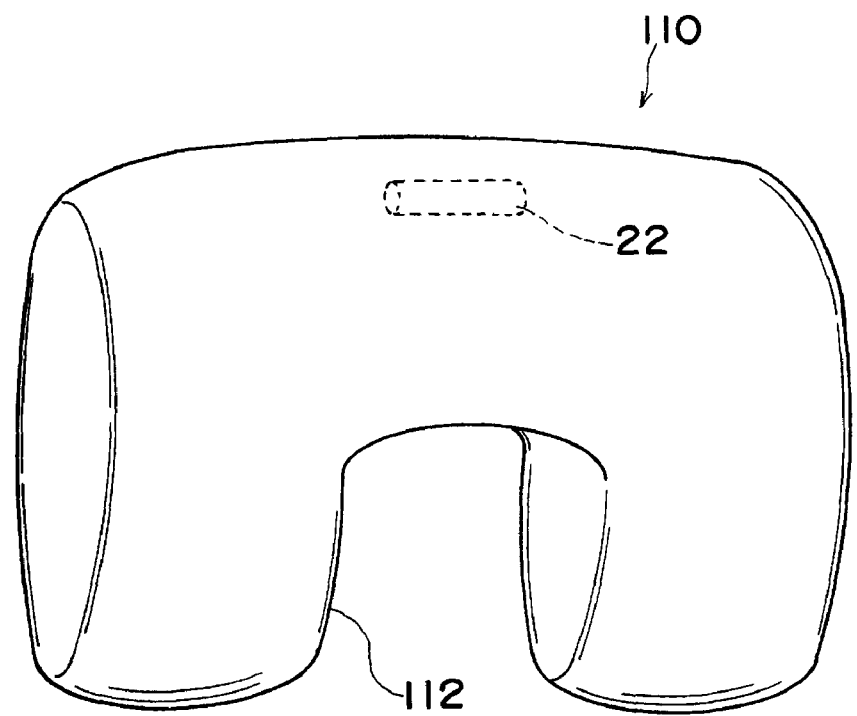
FIG. 17B is a schematic view of a knee airbag which is an example of a variation on the shape of the knee airbag shown in FIG. 17A, according to variation 1.

In knee airbags 108 and 110 shown in FIGS. 17A and 17B, a cutaway portion 112 is formed at an upper edge center portion or a lower edge center portion, respectively, of the pillow shape knee airbag shown in FIG. 16. As a result, sectional areas S2 at both end portion sides of knee airbags 108 and 110 are larger than sectional areas S1 at central portions in length directions thereof, and length h2, at both end portion sides, is longer than length h1 in substantially a vehicle vertical direction, at a central portion in a length direction.

Due to the above structure, in knee airbags 108 and 110, the amount of gas required can be reduced as far as a sectional area of a central portion in a length direction is reduced. In other words, assuming an inflator 22 having the same gas capacity is used, both end portions can be inflated and deployed with greater speed in proportion to the extent that the sectional area of the central portion is reduced. Therefore, according to this example, it is possible to attain both of a reduction in the capacity of inflator 22 and the quick deployment of knee airbags 108 and 110 in a vehicle lateral direction.

Further, as described above, since a length in a substantially vehicle vertical direction is set to be small at a central portion and large at each end portion, a vehicle occupant knee protection region expands in a vertical direction. Therefore, even when the seat height of a vehicle seat is adjusted according to the bodily frame of a vehicle occupant, the knees of the vehicle occupant can be accurately received and stopped. As a result, according to this example, a wide range of bodily frames of vehicle occupants can be accommodated for.

Variation 2

Figure 18C:
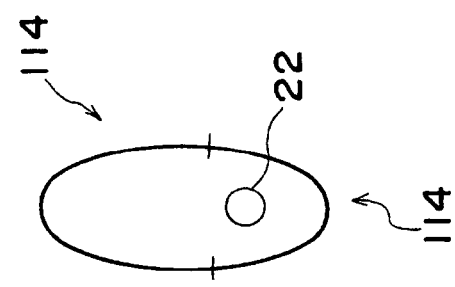
FIG. 18C is a partial sectional view (a sectional view along line B-B of FIG. 18A) showing the state of a knee airbag according to variation 2 after breaking a tear seam.
Figure 18B:
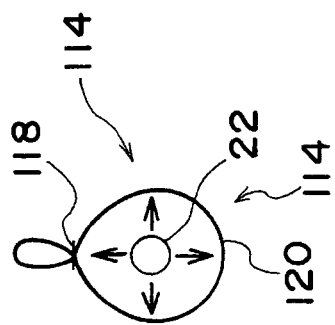
FIG. 18B is a partial sectional view (a sectional view along line B-B of FIG. 18A) showing the state of a knee airbag according to variation 2 before breaking a tear seam.
Figure 18A:
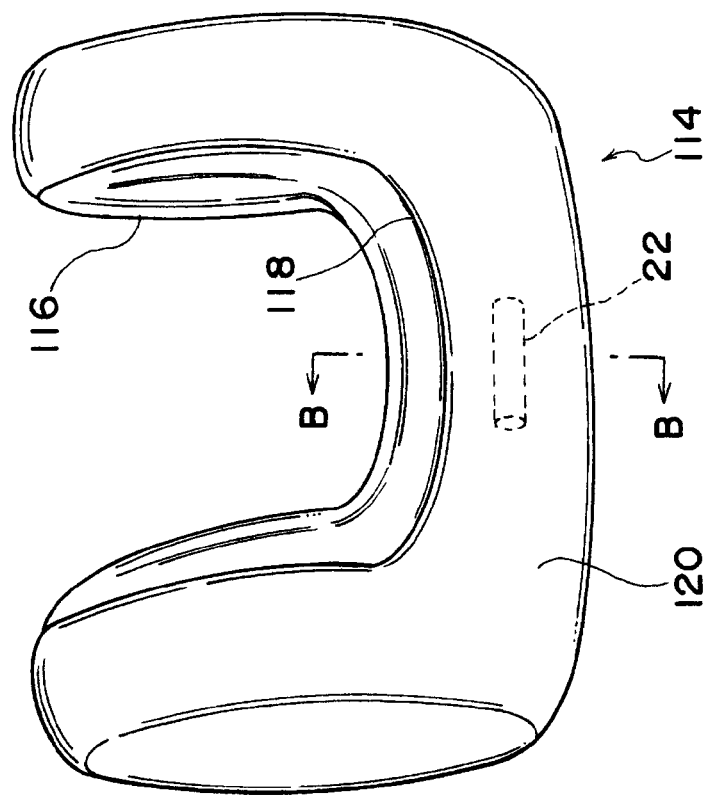
FIG. 18A is a schematic view of a knee airbag according to variation 2.

Knee airbag 114, shown in FIGS. 18A-18C has, in terms of shape, a similar shape to pillow shape knee airbag 108 shown in FIG. 17A. In other words, a cutaway portion 116 is formed in a central portion in a length direction thereof; thereby, the overall front shape of knee airbag 114 is an upright "U" shape, at which a central portion in a length direction opens towards an upper side. Therefore, the characteristics (properties) of knee airbag 108 shown in FIG. 17A, are also possessed by knee airbag 114 shown in FIG. 18.

Further, in knee airbag 114, since an inner peripheral side of cutaway portion 116 is stitched with a tear seam 118, a gas flow path 120 having a "U" shape which opens upwards from the front is formed at portions further towards an outer side than tear seam 118. Therefore, in knee airbag 114, a gas flow path 120 having a comparatively large diameter is formed.

Since an inner bag (inner duct) is formed using a tear seam at an outer peripheral portion of a knee airbag, this variation can be said to belong to FIG. 15 of the above-described fifth embodiment. Therefore, the effects provided by the fifth embodiment can also be obtained similarly with knee airbag 114. Further, FIG. 18B is a sectional view along line B-B of FIG. 18A, and shows the state of tear seam 118 before breaking, and FIG. 18C shows the state of tear seam 118 after breaking.

Variation 3

Figure 19:
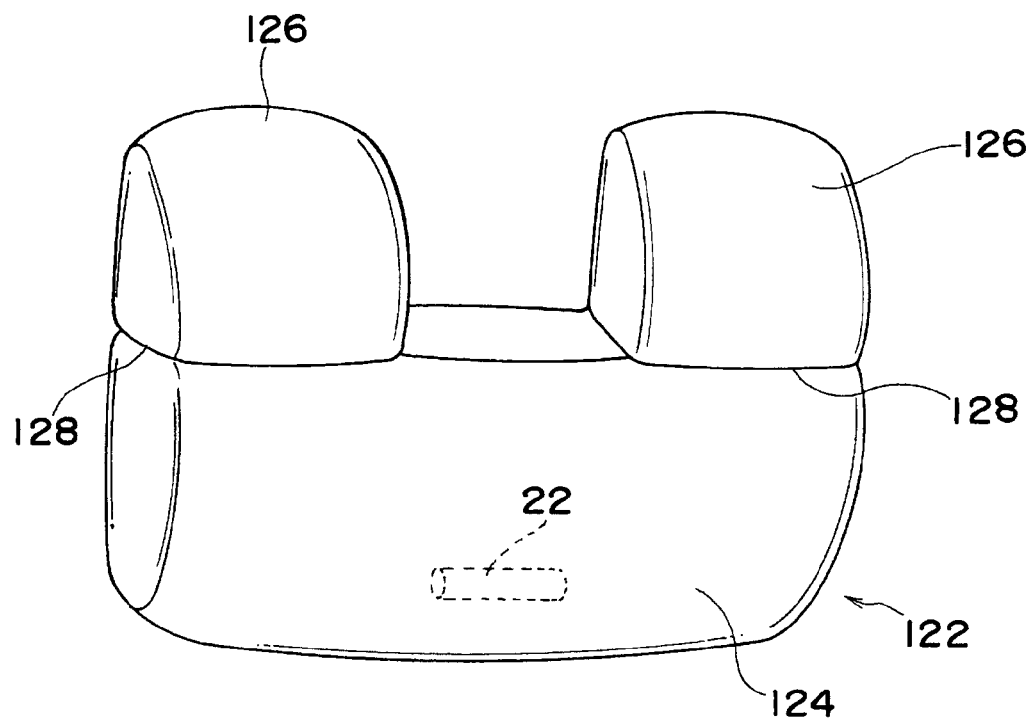
FIG. 19 is a schematic view according to variation 3.

Knee airbag 122 shown in FIG. 19 has, overall, a front shape which is similar to that shown in FIG. 17A. Therefore, the characteristics (properties) of knee airbag 108 shown in FIG. 17A are also possessed by knee airbag 122 shown in FIG. 19.

Moreover, in this example, since tear seams 128 are stitched only at a pair of left and right upper portions 126 of pillow shaped main body portion 124, main body portion 124 and the pair of left and right upper portions 126 are partitioned. Therefore, since this example is similar to the fifth embodiment with respect to stitching with a tear seam 128, the effects provided by the fifth embodiment can be obtained.

Variation 4

Figure 20:
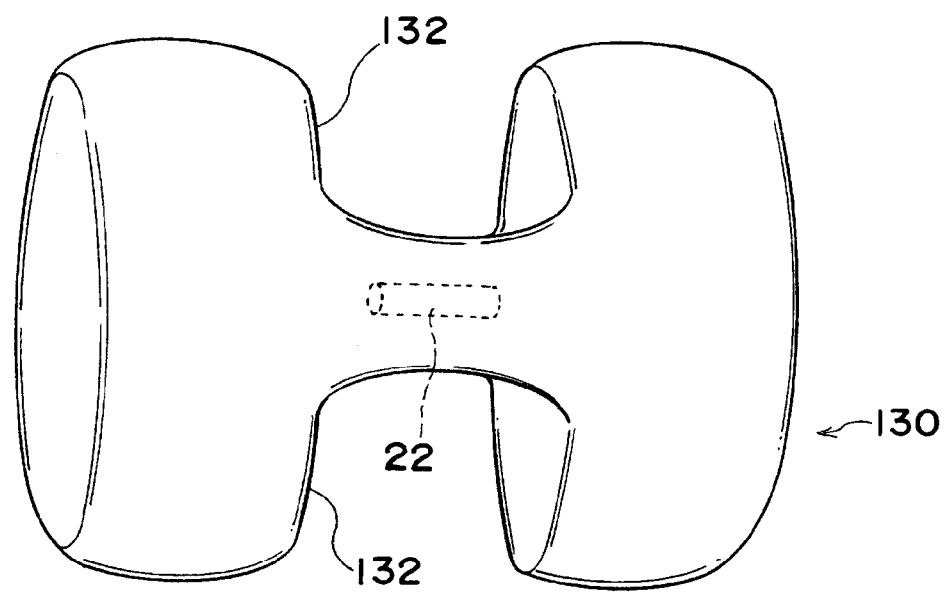
FIG. 20 is a schematic view according to variation 4.

Knee airbag 130 shown in FIG. 20 has a substantially "H" shaped frontal shape, and cutaway portions 132 are formed respectively at an upper edge central portion and a lower edge central portion thereof. Therefore, this knee airbag 130 can be regarded as a combination of knee airbags 108 and 110 shown in FIGS. 17A and 17B respectively.

Variation 5

Figure 21A:
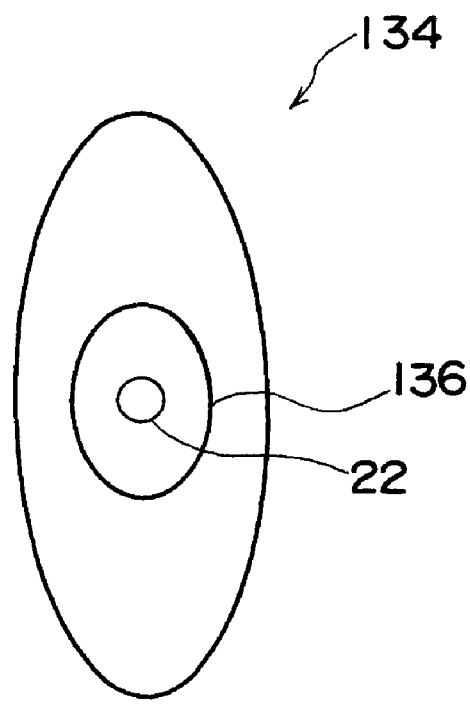
FIG. 21A is a schematic view according to variation 5.

In knee airbag 134 shown in FIG. 21A, inner bag 136 is disposed at an inner portion thereof. Inflator 22 is disposed inside inner bag 136. Further, gas exit openings (not shown) are disposed at appropriate locations (such as both edge portions in a length direction or the like) at inner bag 136.

According to the above structure, due to the provision of inner bag 136, a gas flow path can be reliably ensured in knee airbag 134. Therefore, in a frontal collision, knee airbag 134 can inflate and deploy quickly and reliably to a small space 48 between the knees of a vehicle occupant and instrument panel 12.

Figure 21B:
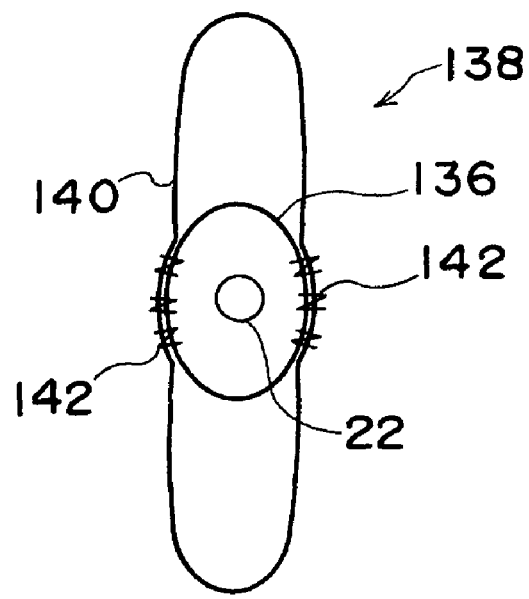
FIG. 21B is a schematic view of a knee airbag which is an example of a variation on the shape of the knee airbag in FIG. 21A, according to variation 5.

In knee airbag 138 shown in FIG. 21B, an outer peripheral portion of inner bag 136 is stitched to a base cloth of main body portion 140. Stitched portion 142 is configured securely so as not to break under bag inflation pressure.

According to the above structure, since the thickness of knee airbag 138 at a time of inflating and deploying (particularly the thickness of protection portions 106) is decreased, an effect that protection portions 106 of knee airbag 138 more readily enter a space 48 between instrument panel 12 and the knees of a vehicle occupant is obtained. Further, gas capacity can be reduced to a minimum amount necessary.

Further, instead of the above stitching, a strap or a tether may be used to limit (regulate) the thickness of protection portions 106 of knee airbag 138. This configuration corresponds to the "thickness regulation means" of claim 4 of the present invention.

Variation 6

FIGS. 22-24 show variations of gas flow paths.

Figure 22A:
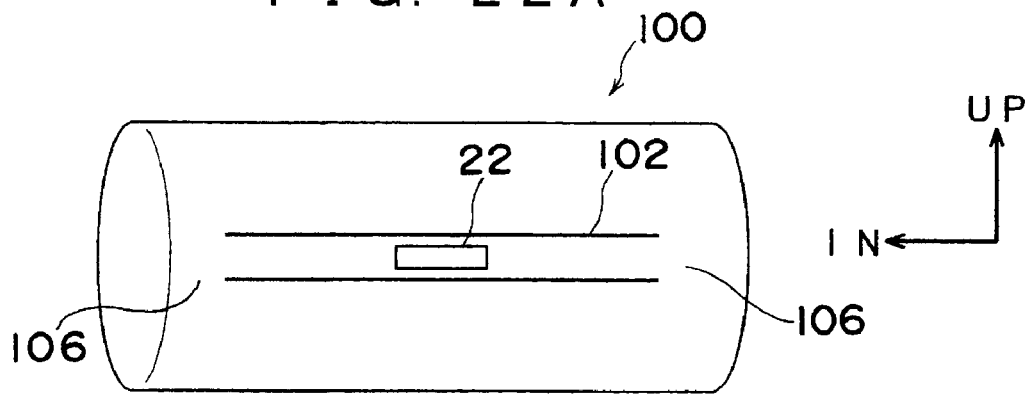
FIG. 22A is a schematic view of a knee airbag according to variation 6.

FIG. 22A shows a standard gas flow path, which has the same structure as that of knee airbag 100 shown in FIG. 16. Gas flow path 102 is of a type that extends along a straight line in a vehicle lateral direction.

Figure 22B:
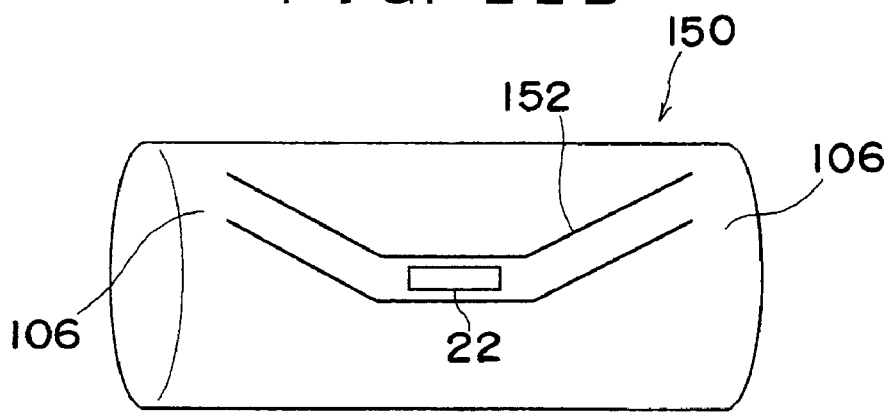
FIG. 22B is a schematic view of a knee airbag which is an example of a variation on the shape of the knee airbag in FIG. 22A, according to variation 6.

Next, in knee airbag 150 shown in FIG. 22B, gas flow path 152 is formed in substantially a "V" shape. This extent of "V" shape is included in "a gas supply opening . . . and the pair of protection portions are arranged on substantially the same straight line in a vehicle lateral direction via the gas flow path" of claim 1.

Figure 22C:
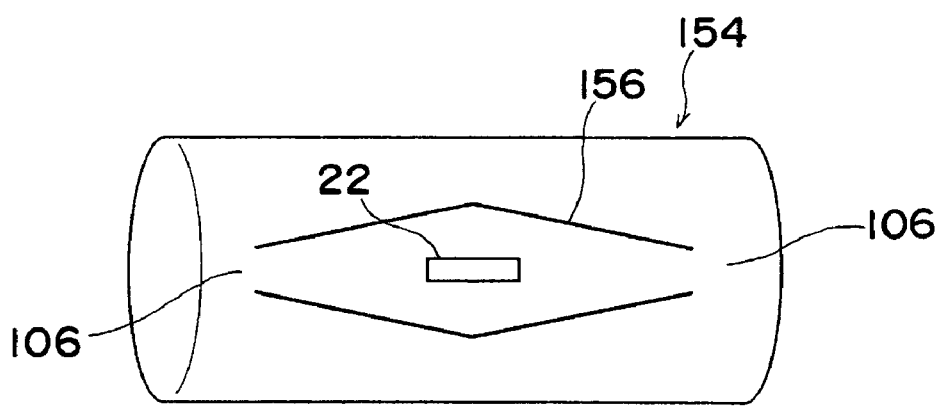
FIG. 22C is a schematic view of a knee airbag which is an example of an alteration to the shape of the knee airbag in FIG. 22A, according to variation 6.

In knee airbag 154 shown in FIG. 22C, a diameter of gas flow path 156 is at a maximum at a central portion in a length direction, and decreases towards both ends in a length direction. This kind of gas flow path, in which the diameter thereof changes in a length direction, is included in "a gas supply opening . . . and the pair of protection portions are arranged on substantially the same straight line in a vehicle lateral direction via the gas flow path" of claim 1.

Variation 7

Figure 23A:
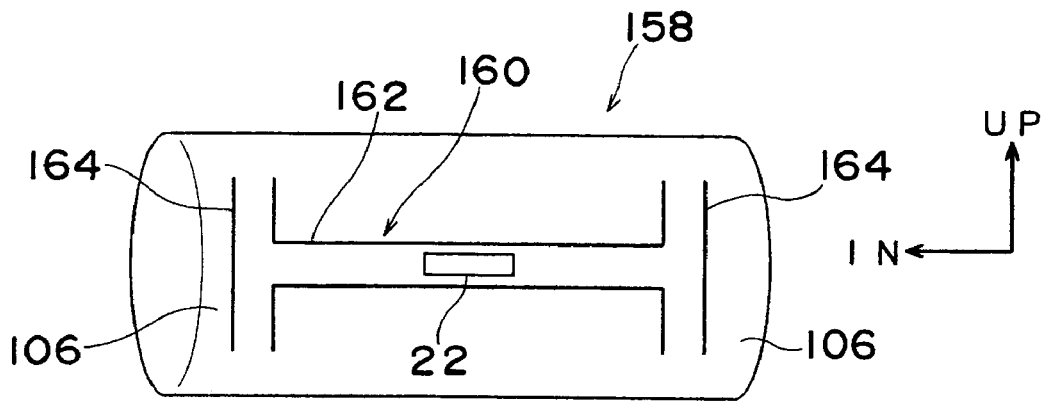
FIG. 23A is a schematic view of a knee airbag according to variation 7.

In knee airbag 158 shown in FIG. 23A, gas flow path 160 is formed in substantially an "H" shape. Specifically, gas flow path 160 is made up of a first gas flow path 162, which is disposed along a straight line in a vehicle lateral direction, and a pair of left and right second gas flow paths 164, which are arranged at both ends in a length direction of first gas flow path 162, and which extend in a substantially vehicle vertical direction.

According to the above configuration, since in gas flow path 160, the pair of left and right second gas flow paths 164, which extend in a substantially vehicle vertical direction, and which communicate with first gas flow path 162 at both ends in a length direction thereof, are provided, not only is it possible for the pair of protection portions 106 to be deployed quickly in a vehicle lateral direction using first gas flow path 162, but due to second gas flow paths 164, a left and right pair of protection portions 106 can be deployed quickly in a vehicle vertical direction. Therefore, according to this example, gas that inflates and deploys the pair of protection portions 106 provided to knee airbag 158 can be guided efficiently to a desired position in a vehicle lateral direction and a desired position in a vehicle vertical direction.

Figure 23B:
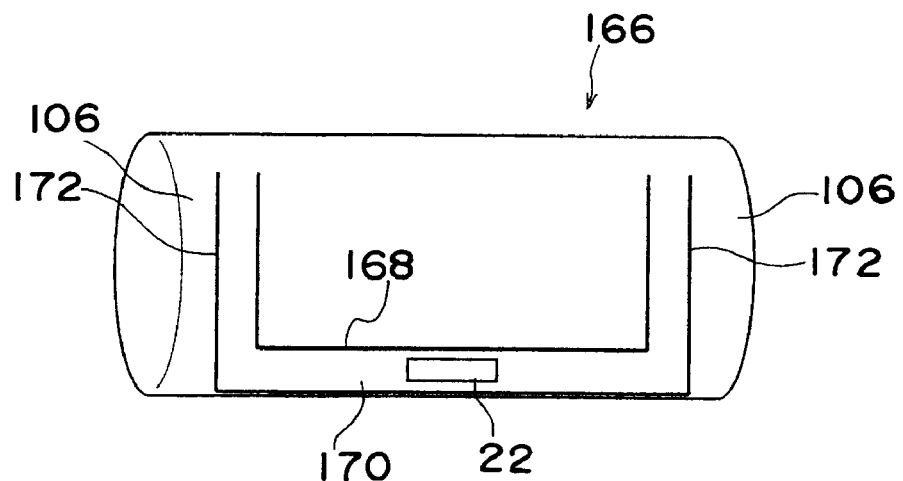
FIG. 23B is a schematic view of a knee airbag which is an example of a variation on the shape of the knee airbag in FIG. 23A, according to variation 7.

Knee airbag 166, shown in FIG. 23B, is formed in a "U" shape, which includes gas flow path 168 which is made up of first gas flow path 170 and a pair of left and right second gas flow paths 172. Therefore, this example can be said to be a variation of knee airbag 158 shown in FIG. 23A, and similar operations and effects can be achieved thereby.

Figure 23C:
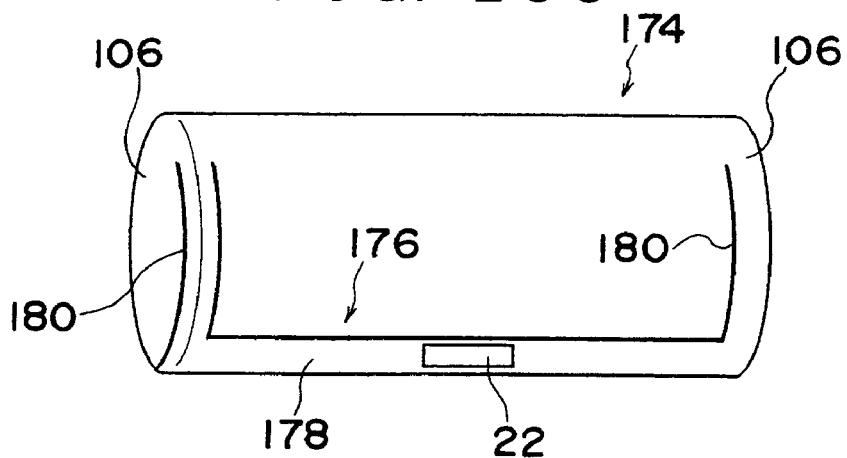
FIG. 23C is a schematic view of a knee airbag which is an example of a variation on the shape of the knee airbag in FIG. 22A, according to variation 7.

Knee airbag 174, shown in FIG. 23C, is similar to the example shown in FIG. 23B in that gas flow path 176 is formed in a "U" shape, made up of first gas flow path 178 and a pair of left and right second gas flow paths 180. Therefore, operations and effects achieved by knee airbag 166 of FIG. 23B can be achieved in a similar manner.

Further, in gas flow path 176, since first gas flow path 178 is disposed along a lower edge of knee airbag 174, and second gas flow paths 180 are disposed along side edges at column sides of the pair of protection portions 106, the entire gas flow path 176 imparts increased strength as a frame of the deployed shape of knee airbag 174.

Variation 8

Figure 24A:
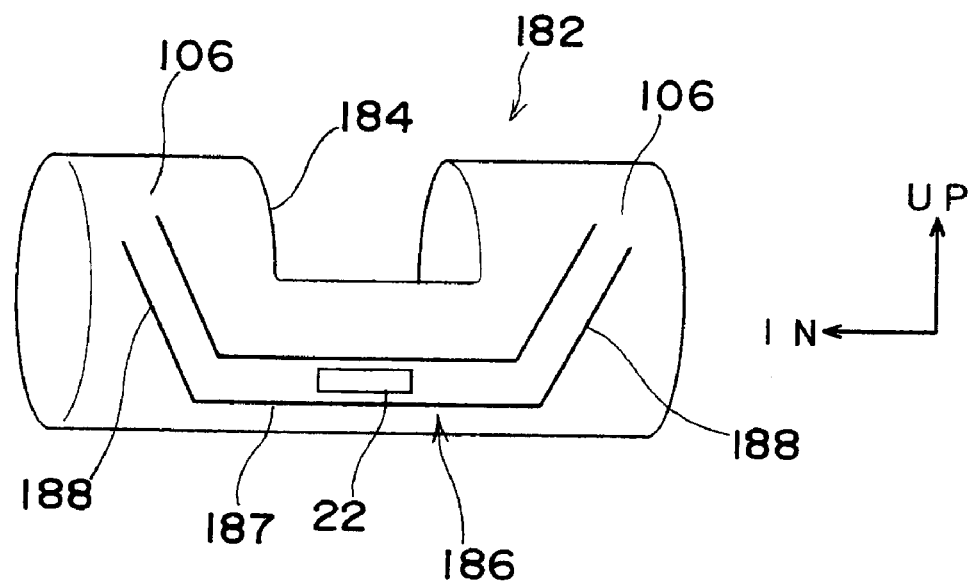
FIG. 24A is a schematic view of a knee airbag according to variation 8.

In knee airbag 182, shown in FIG. 24A, cutaway portion 184 is formed at an upper edge side central portion thereof, and knee airbag 182 overall is formed in substantially a "U" shape. Further, in knee airbag 182, gas flow path 186 is formed in substantially a "V" shape made up of first gas flow path 187 and a pair of left and right inclined second gas flow paths 188, matching the shape of a bag. Therefore, this example possesses both the operations and effects of knee airbag 108 shown in FIG. 17A, and those of knee airbag 166 shown in FIG. 23B.

Figure 24B:
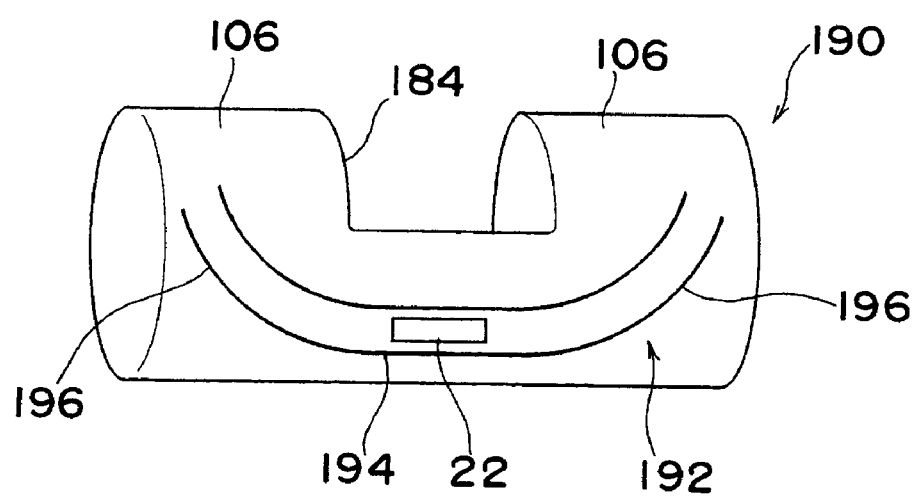
FIG. 24B is a schematic view of a knee airbag which is an example of a variation on the shape of the knee airbag in FIG. 22A, according to variation 8.

Knee airbag 190, shown in FIG. 24B, includes gas flow path 192 formed in substantially a "U" shape and made up of first gas flow path 194 and a pair of left and right curved second gas flow paths 196. The operations and effects thereof are basically similar to the example shown in FIG. 24A, but additionally, since there is little gas flow resistance at a connection portion between first gas flow path 194 and second gas flow path 196, the pair of left and right protection portions 106 can be inflated and deployed more quickly between instrument panel 12 and the knees of a vehicle occupant.

In the above-described embodiments, inflator 22 or the like is disposed inside column cover 20 of steering column 16; however, the position thereof is not limited thereto, and the inflator may be disposed outside of an inner portion of column cover 20. If an inflator is arranged at a position far from a column cover, a linking means such as a hose or the like may be used to link the inflator and a gas supply opening. Further, in this case, the linking means, in addition to the inflator, correspond to the gas supply means of the invention.

DESCRIPTION OF REFERENCE NUMERALS

10 Vehicle knee airbag device
12 Instrument panel
16 Steering column
22 Inflator (gas supply means)
36 Knee airbag
38 First inflation portion (gas flow path)
42 Gas supply opening
44 Stitched portion
46 Protection portion
50 Stitched portion
51 Inflator (gas supply means)
52 Gas flow path
54 Knee air bag
60 Gas ejection hole
62 Gas ejection hole
66 Gas ejection hole
70 Knee airbag
72 Inner duct
76 Inner duct
78 Inner duct
78A Short end portion
78B Long end portion
80 Instrument panel
82 Rounded portion
84 Space
86 Space
90 Knee airbag
92 Inner duct
96 Tear seam
100 Knee airbag
102 Gas flow path
104 Gas supply opening
106 Protection portion 108 Knee airbag
110 Knee airbag
114 Knee airbag
188 Tear seam
120 Gas flow path
122 Knee airbag
128 Tear seam
130 Knee airbag
134 Inner bag
138 Knee airbag
142 Stitched portion (thickness adjusting means)
150 Knee airbag
152 Gas flow path
154 Knee airbag
156 Gas flow path
158 Knee airbag
160 Gas flow path
162 First gas flow path
164 Second gas flow path
166 Knee airbag
168 Gas flow path
170 First gas flow path
172 Second gas flow path
174 Knee airbag
176 Gas flow path
178 First gas flow path
180 Second gas flow path
182 Knee airbag
186 Gas flow path
187 First gas flow path
188 Second gas flow path
190 Knee airbag
192 Gas flow path
194 First gas flow path
196 Second gas flow path

The invention claimed is:

1. A vehicle knee airbag device stored in a folded state in a column cover of a steering column, that inflates in a collision due to a supply of gas from a gas supply means, opens a cover provided at the column cover, and deploys a knee airbag between an instrument panel and the knees of a vehicle occupant, wherein:
in a state of complete inflation and deployment, the knee airbag comprises a pair of protection portions positioned at both sides of the steering column that protect the knees of the vehicle occupant, and a gas flow path that inflates along a vehicle lateral direction at an outer side of the column cover and that communicates with the pair of protection portions at a side of an instrument panel that opposes the knees of the vehicle occupant; and
a gas supply opening, provided at the gas flow path and leading from the gas supply means, and the pair of protection portions are arranged on substantially the same straight line in a vehicle lateral direction via the gas flow path.

2. The vehicle knee airbag device of claim 1, wherein a sectional area of respective end portion sides of the knee airbag is larger than that of a central portion in a vehicle lateral direction.

3. The vehicle knee airbag device of claim 2, wherein the respective end portion sides of the knee airbag are longer in a substantially vehicle vertical direction than the central portion in a vehicle lateral direction.

4. The vehicle knee airbag device of claim 1, wherein the knee airbag is provided with a thickness regulating means for regulating a thickness of the airbag.

5. The vehicle knee airbag device of claim 1, wherein the gas flow path is provided with a first gas flow path extending in a vehicle lateral direction.

6. The vehicle knee airbag device of claim 5, wherein the first gas flow path is provided with a second gas flow path that communicates therewith at an end portion thereof in a lateral direction of the gas flow path, and that extends in a substantially vehicle vertical direction.

7. The vehicle knee airbag device of claim 5, wherein the gas flow path is formed of an inner bag or an inner duct provided in the knee airbag.

8. The vehicle knee airbag device of claim 7, wherein an inner diameter of a central portion in a length direction of the inner bag or inner duct is larger than an inner diameter of respective ends of the inner bag or the inner duct in a length direction thereof.

9. The vehicle knee airbag device of claim 7, wherein:
in the case of an instrument panel in which a distance between one knee and the instrument panel is shorter than the distance between another knee and the instrument panel,
the gas flow path is configured to have short and long lengths from a bent portion to respective ends of the gas flow path, the bent portion resulting from bending the gas flow path at a predetermined position in a length direction; and
the knee airbag is provided such that, when it is in an inflated and deployed state, the short length of the gas flow path is deployed between the instrument panel and the one knee, and the long length of the gas flow path is deployed between the instrument panel and the other knee.

10. The vehicle knee airbag device of claim 5, wherein the gas flow path is formed using a tear seam that breaks when an internal pressure of the gas flow path reaches a predetermined value.

11. The vehicle knee airbag device of claim 5, wherein the gas flow path is formed of an inner duct, and wherein the inner duct is provided by reverse folding a portion of the gas supply means side of the knee airbag towards the knee airbag main body, and stitching the fold using a tear seam.

12. The vehicle knee airbag device of claim 5, wherein the gas flow path is formed of an inner bag, and wherein the inner bag is disposed in the knee airbag, and the gas supply means is disposed in the inner bag.

13. The vehicle knee airbag device of claim 1, wherein the gas supply opening from the gas supply means is provided near a central portion in a vehicle lateral direction of the gas flow path, and gas ejected from the gas supply opening is supplied from the central portion of the gas flow path to both of an inner side and an outer side in a vehicle lateral direction.

14. The vehicle knee airbag device of claim 13, wherein the gas supply means is disposed so as to be in a partially inserted state at a position facing the gas supply opening, and at an outer peripheral portion of the gas supply means, a plurality of gas ejection holes are formed, and the gas ejection holes are only disposed at both of an outer side and an inner side in a vehicle lateral direction of the gas flow path.

15. The vehicle knee airbag device of claim 13, wherein the gas supply means is disposed along a vehicle lateral direction, and a plurality of gas ejection holes are formed at outer peripheral portions of respective ends in a length direction of the gas supply means, and the gas ejection holes are tapered holes that incline at a predetermined angle with respect to an axis line of the gas supply means.

16. A method of deploying a vehicle knee airbag, the method comprising:

in a vehicle knee airbag deployment method in which a knee airbag stored in a folded state in a column cover of a steering column is inflated and deployed to between an instrument panel and the knees of a vehicle occupant due to gas supplied by a gas supply means in a collision, guiding the gas supplied by the gas supply means along a gas flow path provided along a vehicle lateral direction at an instrument panel side and at a column cover outer side of the knee airbag, thereby firstly inflating and deploying, between the instrument panel and the knees of a vehicle occupant, a pair of protection portions provided at respective ends in a vehicle lateral direction of the gas flow path, and subsequently supplying gas to remaining parts of the knee airbag and inflating and deploying the remaining parts, from the pair of protection portions, or from the gas flow path, or from both the pair of protection portions and the gas flow path.

* * * * *